(12) United States Patent
Choe et al.

(10) Patent No.: US 10,091,486 B2
(45) Date of Patent: Oct. 2, 2018

(54) APPARATUS AND METHOD FOR TRANSMITTING AND RECEIVING DIGITAL BROADCASTING SIGNAL

(71) Applicant: LG Electronics Inc., Seoul (KR)

(72) Inventors: Jeehyun Choe, Seoul (KR); Joonhui Lee, Seoul (KR); Jongyeul Suh, Seoul (KR); Kwansuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/979,219

(22) Filed: Dec. 22, 2015

(65) Prior Publication Data

US 2016/0112693 A1 Apr. 21, 2016

Related U.S. Application Data

(63) Continuation of application No. 13/817,377, filed as application No. PCT/KR2011/006022 on Aug. 17, 2011, now Pat. No. 9,258,541.

(Continued)

(51) Int. Cl.
*H04N 13/161* (2018.01)
*H04N 13/106* (2018.01)
(Continued)

(52) U.S. Cl.
CPC ......... *H04N 13/161* (2018.05); *G06T 3/4092* (2013.01); *H04N 5/44591* (2013.01); *H04N 13/0007* (2013.01); *H04N 13/0011* (2013.01); *H04N 13/0029* (2013.01); *H04N 13/0037* (2013.01); *H04N 13/0048* (2013.01); *H04N 13/0059* (2013.01); *H04N 13/0066* (2013.01);
(Continued)

(58) Field of Classification Search
CPC .................................... H04N 13/0029
USPC ...................... 348/43, 725, 51, 54, 552, 723
See application file for complete search history.

(56) References Cited

U.S. PATENT DOCUMENTS 5,351,129 A * 9/1994 Lai ...................... H04N 5/2624
345/634
5,519,780 A * 5/1996 Woo ...................... H04N 7/025
348/467

(Continued)

FOREIGN PATENT DOCUMENTS

CN 1682539 A 10/2005
EP 1501318 A1 1/2005
(Continued)

*Primary Examiner* — Paulos M Natnael
(74) *Attorney, Agent, or Firm* — Dentons US LLP

(57) ABSTRACT

The present invention relates to an apparatus and a method for receiving a digital broadcasting signal including a three-dimensional image and displaying a two-dimensional image. The apparatus for receiving the digital broadcasting signal according to one embodiment of the present invention includes: a tuner for receiving the digital broadcasting signal including a video stream for forming the three-dimensional image and signaling data; a signaling data processor for decoding the digital broadcasting signal including a 2D display window table, which includes information for a partial area of a video image according to the video stream; and a display unit for displaying the video image of the video stream as the two-dimensional image using the information for the partial area.

12 Claims, 39 Drawing Sheets

US 10,091,486 B2
Page 2

Related U.S. Application Data

(60) Provisional application No. 61/374,277, filed on Aug. 17, 2010, provisional application No. 61/374,579, filed on Aug. 17, 2010.

(51) Int. Cl.

| | | |
|---|---|---|
| *H04N 13/111* | (2018.01) | |
| *H04N 13/139* | (2018.01) | |
| *H04N 13/15* | (2018.01) | |
| *H04N 13/194* | (2018.01) | |
| *H04N 13/178* | (2018.01) | |
| *H04N 13/243* | (2018.01) | |
| *H04N 13/25* | (2018.01) | |
| *H04N 13/257* | (2018.01) | |
| *H04N 5/445* | (2011.01) | |
| *H04N 13/00* | (2018.01) | |
| *H04N 21/431* | (2011.01) | |
| *H04N 21/434* | (2011.01) | |
| *H04N 21/81* | (2011.01) | |
| *H04N 13/02* | (2006.01) | |
| *G06T 3/40* | (2006.01) | |
| *H04N 21/2362* | (2011.01) | |
| *H04N 21/4402* | (2011.01) | |

(52) U.S. Cl.
CPC ....... *H04N 13/025* (2013.01); *H04N 13/0242* (2013.01); *H04N 13/0257* (2013.01); *H04N 13/106* (2018.05); *H04N 13/111* (2018.05); *H04N 13/139* (2018.05); *H04N 13/15* (2018.05); *H04N 13/178* (2018.05); *H04N 13/194* (2018.05); *H04N 13/243* (2018.05); *H04N 13/25* (2018.05); *H04N 13/257* (2018.05); *H04N 21/2362* (2013.01); *H04N 21/4316* (2013.01); *H04N 21/4345* (2013.01); *H04N 21/440263* (2013.01); *H04N 21/816* (2013.01); *H04N 2013/0077* (2013.01); *H04N 2013/0081* (2013.01)

(56) References Cited

U.S. PATENT DOCUMENTS

| | | | | |
|---|---|---|---|---|
| 5,621,430 A * | 4/1997 | Bricklin | ........... | G06F 3/0481 |
| | | | | 345/686 |
| 6,240,555 B1 * | 5/2001 | Shoff | ........... | H04N 5/44543 |
| | | | | 348/E5.104 |
| 6,493,005 B1 * | 12/2002 | Wu | ........... | G09G 5/14 |
| | | | | 348/E5.006 |
| 8,400,568 B2 * | 3/2013 | Karaoguz | ........... | G06F 3/14 |
| | | | | 345/698 |
| 9,258,541 B2 * | 2/2016 | Choe | ........... | H04N 5/44591 |
| 9,311,692 B1 * | 4/2016 | Jia | ........... | G06T 3/4092 |
| 2002/0051080 A1 * | 5/2002 | Tanaka | ........... | H04N 5/232 |
| | | | | 348/552 |
| 2002/0166885 A1 * | 11/2002 | Sugawara | ........... | B23K 20/004 |
| | | | | 228/103 |
| 2004/0158876 A1 * | 8/2004 | Lee | ........... | H04N 5/44543 |
| | | | | 725/136 |
| 2005/0081158 A1 * | 4/2005 | Hwang | ........... | G06Q 30/02 |
| | | | | 715/740 |
| 2005/0147309 A1 | 7/2005 | Katata et al. | | |
| 2005/0259147 A1 | 11/2005 | Nam et al. | ........... | 348/43 |
| 2007/0130595 A1 * | 6/2007 | McElhatten | ........... | G06F 3/0482 |
| | | | | 725/88 |
| 2008/0303832 A1 | 12/2008 | Kim et al. | ........... | 345/501 |
| 2009/0075673 A1 * | 3/2009 | Kim | ........... | G01C 21/343 |
| | | | | 455/456.1 |
| 2010/0157025 A1 * | 6/2010 | Suh | ........... | H04N 13/0059 |
| | | | | 348/51 |
| 2010/0165079 A1 | 7/2010 | Yamada | ........... | 348/43 |
| 2010/0214481 A1 * | 8/2010 | Karaoguz | ........... | G09G 5/14 |
| | | | | 348/554 |
| 2010/0306708 A1 * | 12/2010 | Trenz | ........... | G06F 3/0482 |
| | | | | 715/853 |
| 2010/0315493 A1 | 12/2010 | Hamada | ........... | 348/51 |
| 2010/0328426 A1 | 12/2010 | Matsubara | ........... | 348/42 |
| 2011/0013000 A1 | 1/2011 | Mori | ........... | 348/51 |
| 2011/0023066 A1 * | 1/2011 | Jang | ........... | H04N 13/0048 |
| | | | | 725/54 |
| 2011/0138416 A1 | 6/2011 | Kang et al. | ........... | 725/39 |
| 2011/0141233 A1 | 6/2011 | Tsukagoshi | ........... | 348/43 |
| 2011/0141234 A1 * | 6/2011 | Tsukagoshi | ........... | H04N 7/52 |
| | | | | 348/43 |
| 2011/0169860 A1 * | 7/2011 | Ito | ........... | G06Q 30/02 |
| | | | | 345/629 |
| 2011/0187817 A1 * | 8/2011 | Sasaki | ........... | G11B 27/00 |
| | | | | 348/42 |
| 2011/0225523 A1 | 9/2011 | Newton et al. | ........... | 715/762 |
| 2011/0267423 A1 | 11/2011 | Suh et al. | ........... | 348/42 |
| 2011/0285726 A1 * | 11/2011 | Redmann | ........... | H04N 9/3102 |
| | | | | 345/467 |
| 2011/0292175 A1 * | 12/2011 | Suh | ........... | H04N 13/0059 |
| | | | | 348/43 |
| 2012/0050502 A1 | 3/2012 | Chi et al. | ........... | 348/51 |
| 2012/0069154 A1 | 3/2012 | Talstra et al. | ........... | 348/51 |
| 2012/0213492 A1 * | 8/2012 | Takeuchi | ........... | H04N 13/007 |
| | | | | 386/244 |
| 2013/0010063 A1 * | 1/2013 | Redmann | ........... | H04N 13/0029 |
| | | | | 348/43 |
| 2013/0088571 A1 * | 4/2013 | Suh | ........... | H04N 13/004 |
| | | | | 348/43 |
| 2016/0086108 A1 * | 3/2016 | Abelow | ........... | G06Q 10/067 |
| | | | | 705/7.29 |

FOREIGN PATENT DOCUMENTS

| | | |
|---|---|---|
| EP | 1734766 A2 | 12/2006 |
| EP | 2528333 A2 | 11/2012 |
| KR | 10-2005-0026959 A | 3/2005 |
| KR | 10-2006-0130451 A | 12/2006 |
| KR | 10-2008-0030360 A | 4/2008 |
| KR | 10-2008-0069891 A | 7/2008 |
| KR | 10-2008-0108882 A | 12/2008 |
| WO | 2004008768 A1 | 1/2004 |
| WO | 2010041896 A2 | 4/2010 |

* cited by examiner

FIG. 2
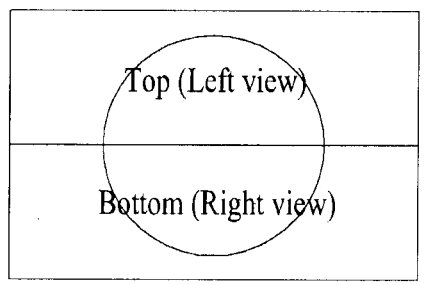
frame-compatible stereoscopic video
(top-and-bottom, 1920x1080)
(a)
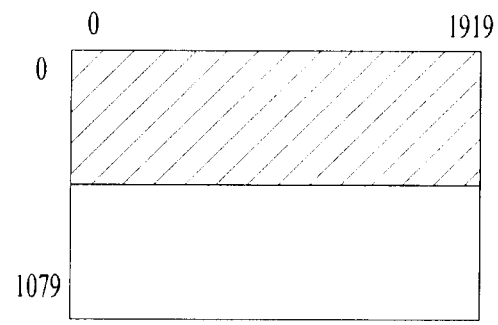
2D display window
(top : 0, bottom : 539, left : 0, right : 1919)
(b)
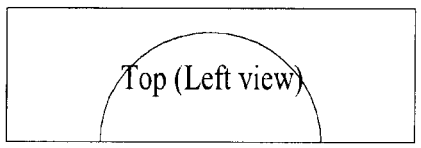
Cropped image definded by 2D display
window
(c)
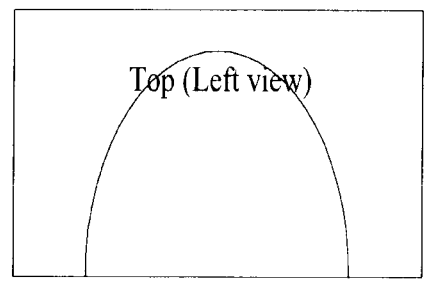
Scaled image
(d)

FIG. 3
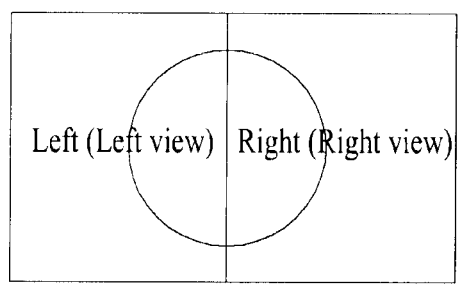
frame-compatible stereoscopic video
(side-by-side, 1920x1080)
(a)
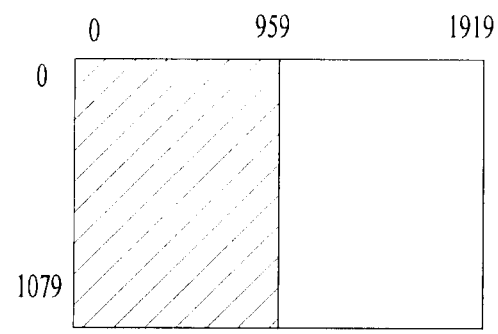
2D display window
(top : 0, bottom : 1079, left : 0, right : 959)
(b)
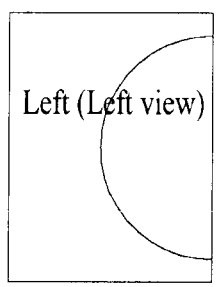
Cropped image definded by 2D display
window
(c)
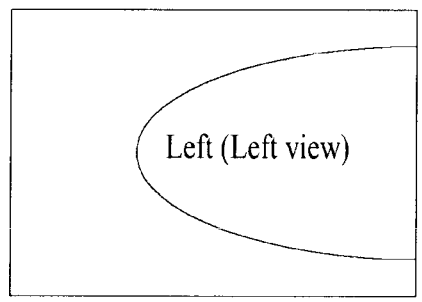
Scaled image
(d)

FIG. 5

| Syntax | No. of bits | Format |
|---|---|---|
| user_data ( ) { | | |
|     user_data_start_code | 32 | bslbf |
|     user_data_identifier | 32 | bslbf |
|     user_structure ( ) | | |
| } | | | user_data_start_code = 0x0000 1B2
user_data_identifier = 0X4741 3934

~ 5010

| Syntax | No. of bits | Format |
|---|---|---|
| user_data_regustered_itu_t_t35 ( ) { | | |
|     itu_t_t35_countury_code | 8 | bslbf |
|     itu_t_t35_provider_code | 16 | bslbf |
|     user_data_identifier | 32 | bslbf |
|     user_structure ( ) | | |
| } | | | user_data_identifier = 0x4741 3934

~ 5011

| Syntax | No. of bits | Format |
|---|---|---|
| ATSC_user_data ( ) { | | |
|     user_data_type_code | 8 | uimsbf |
|     user_data_type_structure ( ) | | |
| } | | | user_data_type_code = 0x10

~ 5020

| Syntax | No. of bits | Format |
|---|---|---|
| 2d_display_window_data ( ) { | | |
|     2d_display_window_table_id | 8 | uimsbf |
|     2d_display_window_index | 16 | uimsbf |
| } | | |

| Syntax | Bits | Format |
|---|---|---|
| 2d_display_window_table_section ( ) { | | |
|     table_ID | 8 | uimsbf |
|     reserved | 3 | Bslbf |
|     version_number | 5 | Bslbf |
|     reserved | 4 | Bslbf |
|     section_length | 12 | uimsbf |
|     number_of_items | 16 | uimsbf |
|     for (i=0; i<number_of_items; i++) { | | |
|         index_value | 16 | uimsbf |
|         2d_window_top_pos | 16 | uimsbf |
|         2d_window_bottom_pos | 16 | uimsbf |
|         2d_window_left_pos | 16 | uimsbf |
|         2d_window_right_pos | 16 | uimsbf |
|     } | | |
| } | | |

FIG. 7

| Syntax | Bits | Format |
|---|---|---|
| 2d_display_window_table_section ( ) { | | |
|     table_ID | 8 | 0xTBD |
|     section_syntax_indicator | 1 | bslbf |
|     private_indicator | 1 | bslbf |
|     reserved | 2 | bslbf |
|     section_length | 12 | uimsbf |
|     source_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     number_of_items | 16 | uimsbf |
|     for (i=0; i<number_of_items; i++) { | | |
|         index_value | 16 | uimsbf |
|         2d_window_top_pos | 16 | uimsbf |
|         2d_window_bottom_pos | 16 | uimsbf |
|         2d_window_left_pos | 16 | uimsbf |
|         2d_window_right_pos | 16 | uimsbf |
|     } | | |
| } | | |

FIG. 9

| Syntax | No. of bits | Format |
|---|---|---|
| 2d_display_window_descriptor( ) { | | |
| descriptor_tag | 8 | 0xTBD |
| descriptor_length | 8 | uimsbf |
| reserved | 8 | uimsbf |
| 2d_window_top_pos | 16 | uimsbf |
| 2d_window_bottom_pos | 16 | uimsbf |
| 2d_window_left_pos | 16 | uimsbf |
| 2d_window_right_pos | 16 | uimsbf |
| } | | |

(a)

| Syntax | No. of bits | Format |
|---|---|---|
| 2d_display_window_descriptor( ) { | | |
| descriptor_tag | 8 | 0xTBD |
| descriptor_length | 8 | uimsbf |
| reserved | 8 | uimsbf |
| 2d_display_window_table_id | 8 | uimsbf |
| 2d_display_window_index | 16 | uimsbf |
| } | | |

| Syntax | No. of bits | Format |
|---|---|---|
| terrestrial_virtual_channel_table_section () { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_chnnels_in_section | 8 | uimsbf |
|   for (i=0; i<num_channels_insection; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequnecy | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptor_length | 10 | uimsbf |
|   for (i=0; i<N; i++) { | | |
|     additional_descriptor() | | |
|   } | | |
|   CRC_32 | 32 | rpchof |
| } | | | descriptor() → 2d display window Descriptor Location

FIG. 11

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i = 0; i < N; i++) { | | |
|         descriptor() | | |
|     } | | |
|     for (i = 0; i < N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i < N2; i++) { | | |
|             descriptor()  ← 2d display window Descriptor Location | | |
|         } | | |
|     } | | |
|     CRC_32 | 32 | rpchof |
| } | | |

FIG. 12

| Syntax | No. of bits | Mnemonic |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i = 0; i < N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (i = 0; i < N; i++) { | | |
|             descriptor ( ) | | |
|         } | | |
|     } | | |
|     CRC_32 | 32 | rpchof |
| } | | |

2d display window Descriptor Location

FIG. 13

| Syntax | No. of bits | Format |
|---|---|---|
| event_information_table_section () { | | |
|    table_id | 8 | 0xC8 |
|    section_syntax_indicator | 1 | '1' |
|    private_indicator | 1 | '1' |
|    reserved | 2 | '11' |
|    section_length | 12 | uimsbf |
|    source_id | 16 | uimsbf |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    protocol_version | 8 | uimsbf |
|    num_events_in_section | 8 | uimsbf |
|    for (j=0; j<num_events_in_section; j++) { | | |
|      reserved | 2 | '11' |
|      event_id | 14 | uimsbf |
|      start_time | 32 | uimsbf |
|      reserved | 2 | '11' |
|      ETM_location | 2 | uimsbf |
|      length_in_seconds | 20 | uimsbf |
|      title_length | 8 | uimsbf |
|      title_text () | var | |
|      reserved | 4 | '1111' |
|      descriptors_length | 12 | |
|      for (i = 0; i < N; i++) { | | |
|         (descriptor()) | | |
|      } | | |
|    } | | |
|    CRC_32 | 32 | rpchof |
| } | | |

→ 2d display window Descriptor Location

FIG. 14

| Syntax | No. of bits | Mnemonic |
|---|---|---|
| event_information_section ( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for (i = 0; i < N; i++) { | | |
|     event_id | | |
|     start_time | 16 | uimsbf |
|     duration | 40 | bslbf |
|     runinng_status | 24 | uimsbf |
|     free_CA_mode | 3 | uimsbf |
|     descriptors_loop_length | 1 | bslbf |
|     for (i = 0; i < N; i+-) { | 12 | uimsbf |
|       descriptor ( ) | | |
|     } | | |
|   } | | |
|   CRC_32 | 32 | rpchof |
| } | | |

2d display window
Descriptor Location (a)

```
<simpleType name="TypeOfSourceType">
        <restriction base="srting">
                <enumeration value = "HD"/>
                <enumeration value = "SD"/>
                <enumeration value = "PIP"/>
                <enumeration value = "SdBarker"/>
                <enumeration value = "HdBarker"/>
                <enumeration value = "PipBarker"/>
                <enumeration value = "3DHD"/>
                <enumeration value = "3DSD"/>
        </restriction>
<simpleType>
```

(b)

FIG. 22
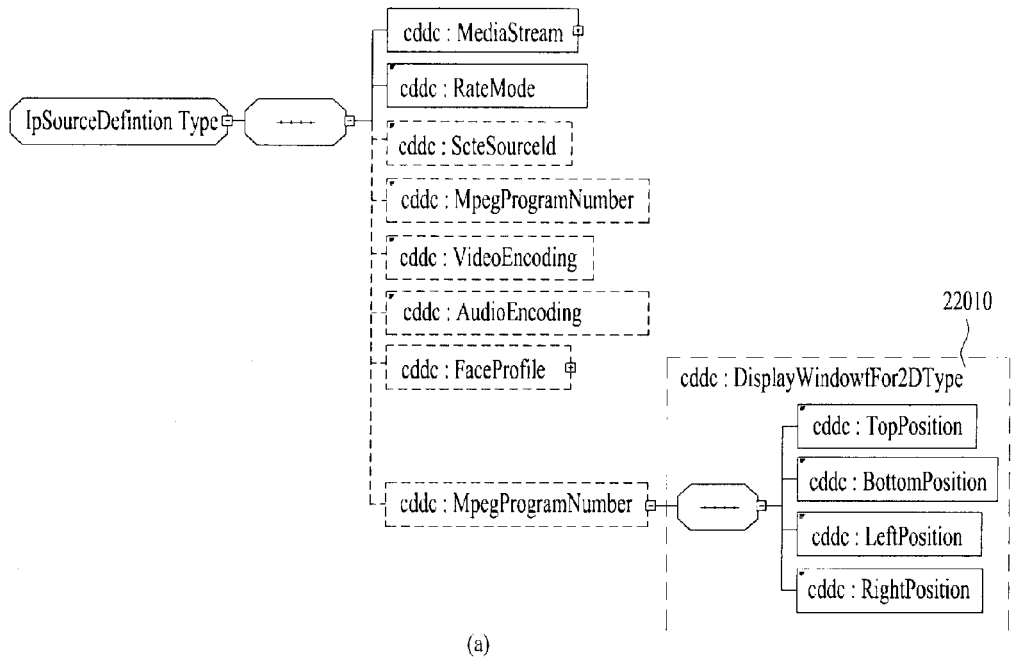
(a)
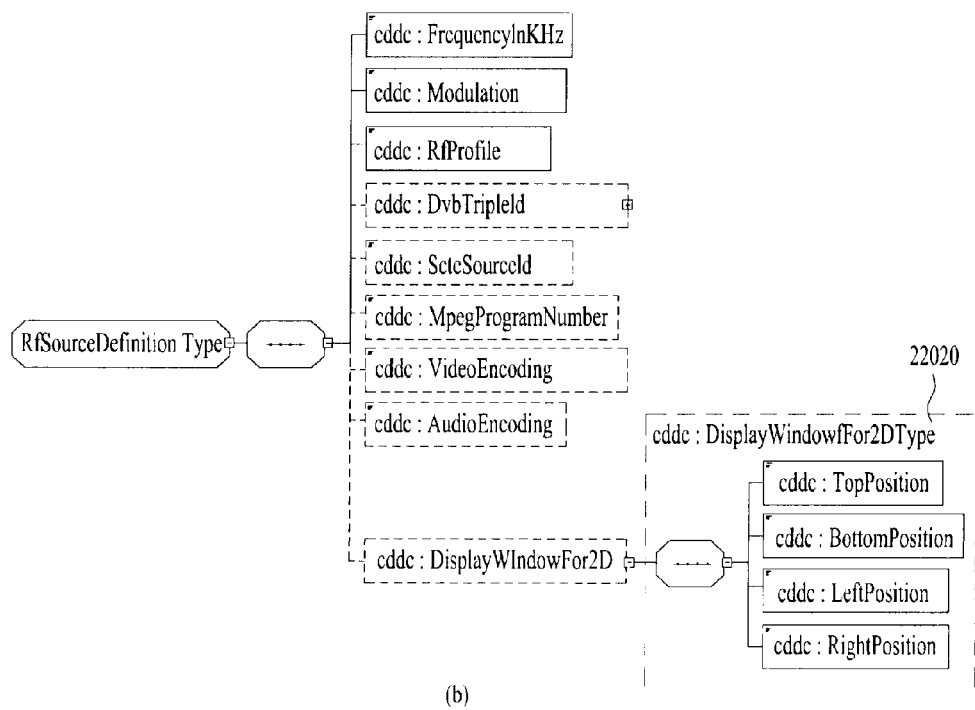
(b)

FIG. 25
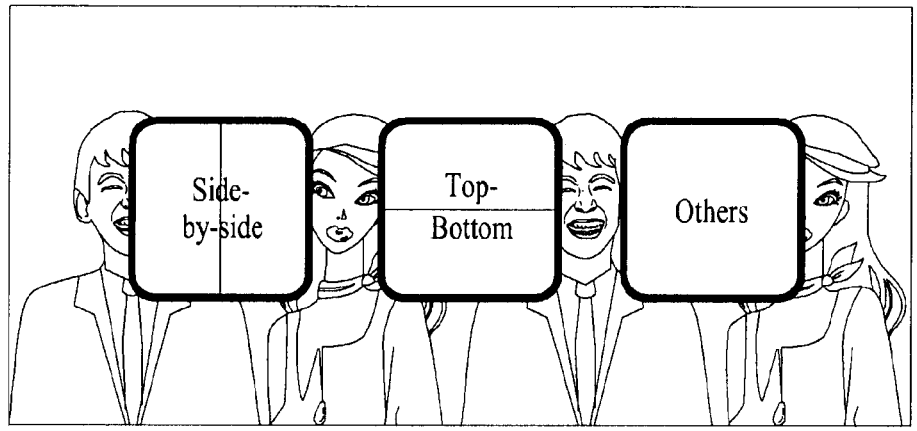
(a)
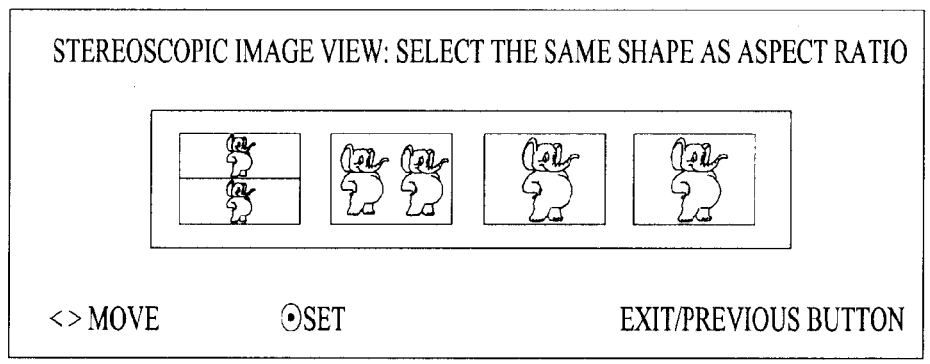
(b)
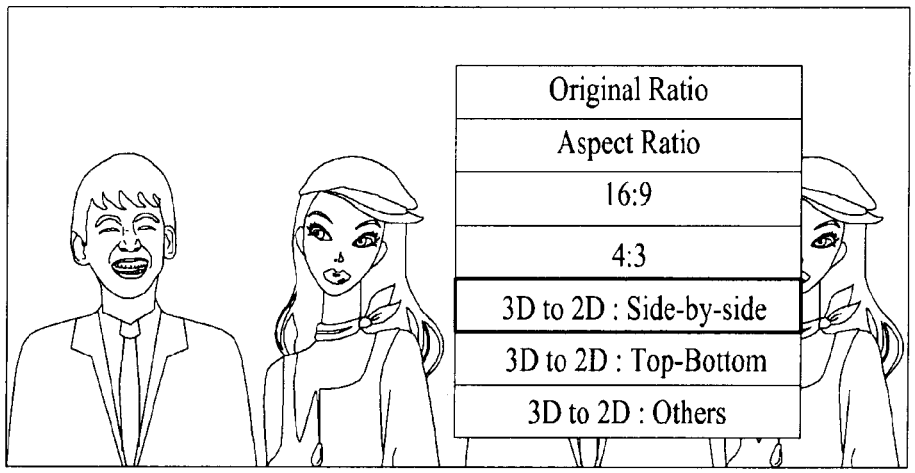
(c)

FIG. 26
(a)
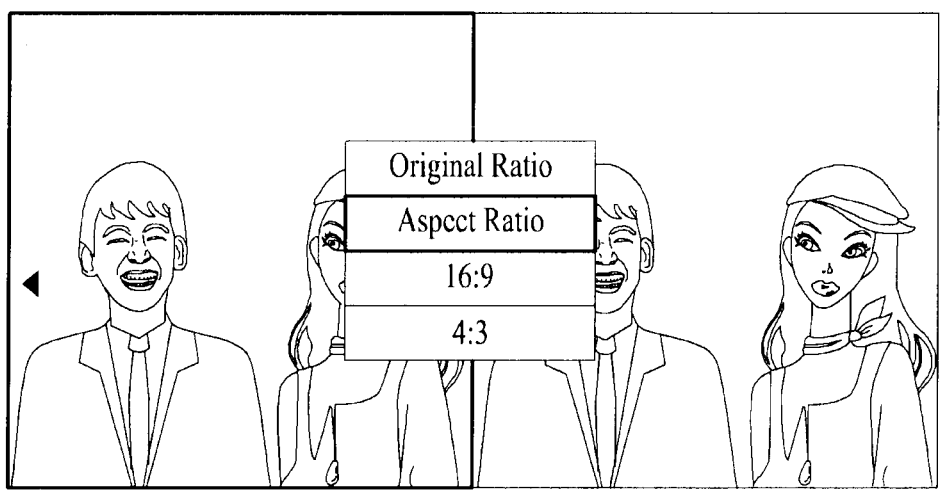
(b)

FIG. 27
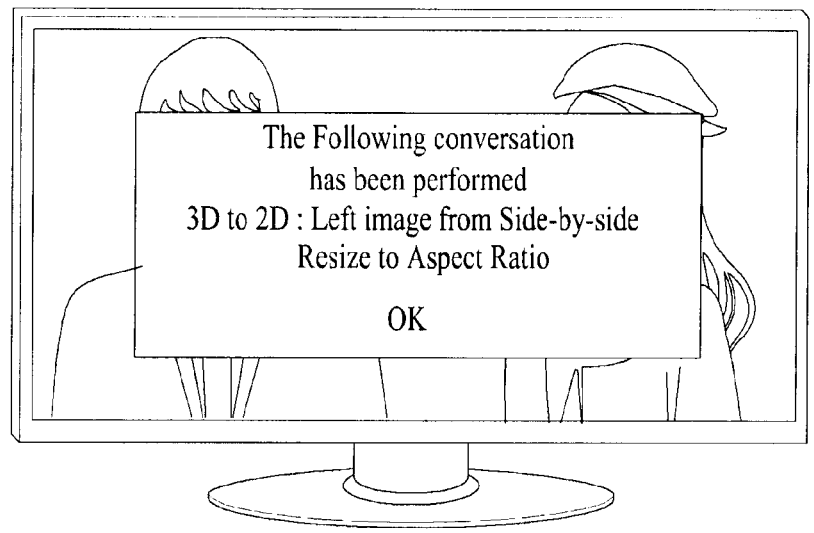
(a)
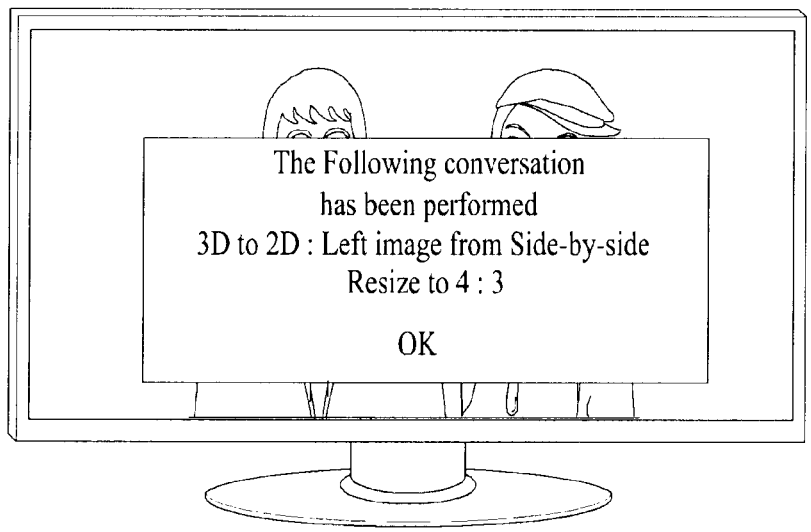
(b)

FIG. 28
(a)
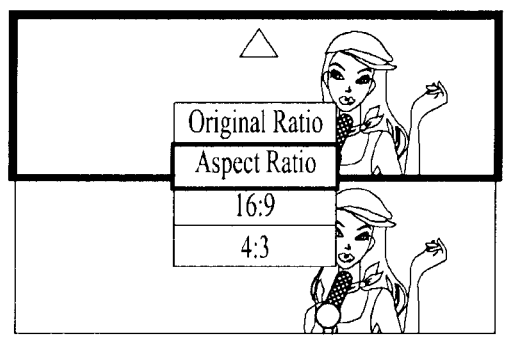
(b)
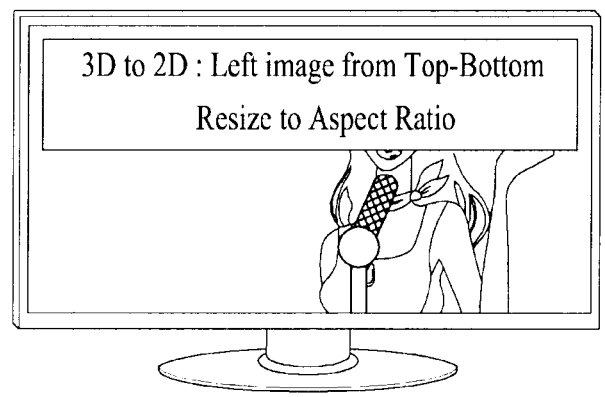
(c)

FIG. 39

| Syntax | No. of bits | Format |
|---|---|---|
| 2d_display_window_descriptor( ) { | | |
|     2d_window_top_pos | 16 | uimsbf |
|     2d_window_bottom_pos | 16 | |
|     2d_window_left_pos | 16 | |
|     2d_window_right_pos | 16 | |
| } | | |

APPARATUS AND METHOD FOR TRANSMITTING AND RECEIVING DIGITAL BROADCASTING SIGNAL

This application is a Continuation of U.S. patent application Ser. No. 13/817,377, filed on Feb. 15, 2013 which is a 35 USC § 371 National Stage entry of International Application No. PCT/KR2011/006022 filed on Aug. 17, 2011, and claims priority of U.S. Provisional Application Nos. 61/374,579 filed on Aug. 17, 2010 and 61/374,277 filed on Aug. 17, 2010, all of which are incorporated by reference in their entirety herein.

TECHNICAL FIELD

The present invention relates to an apparatus and method for receiving a digital broadcast signal including a three-dimensional (3D) video, and more particularly, to an apparatus and method for receiving and a digital broadcast signal including a 3D video as a two-dimensional (2D) video.

BACKGROUND ART

As 3D televisions have come into widespread use, 3D image content has come into widespread use and transmission of 3D video content by a digital broadcast has been activated.

In general, a 3D image provides a stereoscopic effect using the principle of stereo vision. Since a human feels a perspective effect through binocular parallax due to an interval between the eyes spaced apart from each other by about 65 mm, a 3D image is provided such that a left eye and a right eye view respective plan images, thereby providing a stereoscopic effect and a perspective effect.

Examples of a 3D image display method include a stereoscopic method, a volumetric method, a holographic method, etc. In the stereoscopic method, a left view image to be viewed by a left eye and a right view image to be viewed by a right eye are provided and the left eye and the right eye respectively view the left view image and the right view image through polarized glasses or a display device, thereby perceiving a 3D image effect.

In case of stereoscopic 3D video content using a frame compatible format, when two similar images having different views are received, a reception apparatus performs 3D format conversion with respect to the two images and displays a 3D image. If a conventional 2D TV receives such a signal, since 3D format conversion for displaying a 3D image is impossible, two similar images are simultaneously displayed as shown in FIG. 1.

Accordingly, conventionally, a method of configuring and transmitting a 2D image as a separate elementary stream (ES) in addition to a 3D image was used in order to display the 2D image. However, in this method, since two video streams for a 2D image and a 3D image must be transmitted, burden is increased in terms of bandwidth.

DISCLOSURE

Technical Problem

An object of the present invention is to provide a digital broadcast signal reception apparatus and method which is capable of receiving a digital broadcast signal including a 3D image and displaying a 2D image without the above-described problem.

Technical Solution

The object of the present invention can be achieved by providing a digital broadcast signal reception apparatus including a tuner for receiving a digital broadcast signal including a video stream for forming a three-dimensional (3D) image and signaling data, a signaling data processor for decoding a digital broadcast signal including a two-dimensional (2D) display window table including information about a partial region of a video image of the video stream, and a display for displaying the video image of the video stream two-dimensionally using information about the partial region.

The display may include an image editor for cropping, scaling and displaying the video image according to the information about the partial region.

The digital broadcast signal reception apparatus may further include a decoder for decoding the video stream including an identifier indicating the 2D display window table.

In another aspect of the present invention, there is provided a digital broadcast signal reception apparatus including a tuner for receiving a digital broadcast signal including a video stream for forming a three-dimensional (3D) image, a user interface (UI) manager for receiving a screen output mode of the received broadcast signal and receiving a partial region of a video signal of the video stream according to the received screen output mode, and a display for displaying the received partial region on a two-dimensional (2D) screen.

The display may include an image editor for cropping, scaling and displaying the video signal according to the received partial region.

The screen output mode may include a top-bottom mode or a side-by-side mode.

The video signal may be scaled by displaying selectable aspect ratios using an on screen display (OSD) method and selecting a desired aspect ratio.

In another aspect of the present invention, there is provided a method for receiving a digital broadcast signal, including receiving a digital broadcast signal including a video stream for forming a three-dimensional (3D) image and signaling data, decoding a digital broadcast signal including a two-dimensional (2D) display window table including information about a partial region of a video image of the video stream, and displaying the video image of the video stream two-dimensionally using information about the partial region.

The displaying the video image two-dimensionally may include cropping, scaling and displaying the video image according to the information about the partial region.

The digital broadcast signal may further include an identifier (ID) for identifying a 2D display window table.

The ID may be included in a header of the video stream and the 2D display window table is received in a state of being included in the signaling data.

The ID and the 2D display window table may be received in a state of being included in the signaling data.

In another aspect of the present invention, there is provided a method for receiving a digital broadcast signal, including receiving a digital broadcast signal including a video stream for forming a three-dimensional (3D) image, receiving a screen output mode of the received broadcast signal and receiving a partial region of a video signal of the video stream according to the received screen output mode, and displaying the received partial region on a two-dimensional screen.

The displaying the received partial region on the two-dimensional screen may include cropping, scaling and displaying the video signal according to the received partial region.

The screen output mode may include a top-bottom mode or a side-by-side mode.

Advantageous Effects

A digital broadcast signal reception apparatus and method according to the present invention has the following effects.

According to one embodiment of the present invention, the digital broadcast signal reception apparatus can receive and display a digital broadcast signal including a three-dimensional (3D) video signal as a two-dimensional (2D) video signal.

Accordingly to one embodiment of the present invention, when the digital broadcast signal reception apparatus displays a 3D video signal as a 2D video signal, it is possible to accurately set a display region.

Accordingly to one embodiment of the present invention, when the digital broadcast signal reception apparatus displays a 3D video signal as a 2D video signal, it is possible to select and display a desired view.

DESCRIPTION OF DRAWINGS

FIG. 2 is a diagram showing a method of displaying a 3D video signal of a top-bottom mode two-dimensionally according to an embodiment of the present invention;

FIG. 3 is a diagram showing a method of displaying a 3D video signal of a side-by-side mode two-dimensionally according to an embodiment of the present invention;

FIG. 5 is a diagram showing a syntax structure including a 2D display window table identifier according to an embodiment of the present invention;

FIG. 6 is a diagram showing a syntax structure of 2d_display_window_table_section( ) including 2D display window information according to an embodiment of the present invention;

FIG. 7 is a diagram showing a syntax structure of 2d_display_window_table_section( ) including 2D display window information according to an embodiment of the present invention;

FIG. 9 is a diagram showing a syntax structure of 2d_display_window_descriptor( ) according to an embodiment of the present invention;

FIG. 10 is a diagram showing a syntax structure of a TVCT including 2d_display_window_descriptor( ) according to an embodiment of the present invention;

FIG. 11 is a diagram showing a syntax structure of a PMT including 2d_display_window_descriptor( ) according to an embodiment of the present invention;

FIG. 12 is a diagram showing a syntax structure of an SDT including 2d_display_window_descriptor( ) according to an embodiment of the present invention;

FIG. 13 is a diagram showing a syntax structure of an EIT including 2d_display_window_descriptor( ) according to an embodiment of the present invention in ATSC PSIP;

FIG. 14 is a diagram showing a syntax structure of an EIT including 2d_display_window_descriptor( ) according to an embodiment of the present invention in DVB-SI;

FIG. 22 is a diagram showing an XML schema of IPSourceDefinitionType and RFSourceDefinition extended in order to include 2D display window information according to an embodiment of the present invention;

FIG. 25 is a diagram showing a user interface (UI) for selecting a screen output mode of a 3D video signal according to an embodiment of the present invention;

FIG. 26 is a diagram showing a UI for selecting a region to be extracted from a 3D video of a side-by-side mode and a scaling value of a video to be extracted according to an embodiment of the present invention;

FIG. 27 is a diagram showing a confirmation message when a 3D video has been converted into a 2D video according to an embodiment of the present invention;

FIG. 28 is a diagram showing a UI for selecting a region to be extracted from a 3D video of a top-bottom mode and a scaling value of a video to be extracted according to an embodiment of the present invention;

FIG. 39 is a diagram showing a syntax structure including 2D display window information according to an embodiment of the present invention.

BEST MODE

Figure 1:
FIG. 1 is a diagram showing the case in which a conventional TV displays a 3D video signal according to an embodiment of the present invention.

Hereinafter, the embodiments of the present invention will be described in detail with reference to the accompanying drawings although the present invention is not limited by the embodiments.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A 3D image display method may include a stereoscopic method considering two views and a multiple view image method (a multi-view method) considering three or more views. A conventional single view image is referred to as a monoscopic image method.

The stereoscopic method uses a pair of images, that is, a left view image and a right view image, acquired by capturing the same subject using a left camera and a right camera spaced apart from each other by a constant distance. The multi-view method uses three or more images acquired by capturing the same subject using three or more cameras having constant distances or angles. Hereinafter, although the stereoscopic method is described in one embodiment of the present invention, the present invention is applicable to a multi-view method.

The stereoscopic method according to the present invention includes a side-by-side mode, a top-bottom mode, a checker board mode, etc. In the side-by-side mode, a left image and a right image are ½ down-sampled in a horizontal direction, one sampled image is located in a left region and the other sampled image is located in a right region, thereby configuring one stereoscopic image. In the top-bottom mode, a left image and a right image are ½ down-sampled in a vertical direction, one sampled image is located in a top region and the other sampled image is located in a bottom region, thereby configuring one stereoscopic image. In the checker board mode, a left image and a right image are ½ down-sampled to be crossed in vertical and horizontal directions such that two images are combined into one image. However, the stereoscopic method according to the present invention is not limited to the above examples.

When a 3D image is transmitted, compatibility with a 2D image must be taken into account. A reception apparatus which does not support 3D image display must display a 3D image included in a received broadcast signal as a 2D image. Even a 3DTV may display a 2D image as necessary.

Accordingly, the present invention provides a digital broadcast signal reception apparatus and method for outputting a part of an image included in a video stream as a 2D image. In this case, since a part of a 3D video frame is used as a 2D image, it is possible to provide both a 2D image and a 3D image without consuming additional bandwidth.

A transmitter may transmit signaling data necessary to output a part of a 3D video frame as a 2D image and a reception apparatus may crop and output a partial region of a 3D video frame as a 2D image using the signaling data.

In the present invention, the signaling data, that is, information indicating the partial region of the 3D video frame, is referred to as 2D display window information. In addition, the partial region of the 3D video frame used as the 2D image is referred to as a 2D display window. In addition, a separate table including 2D display window information is referred to as a 2D display window table and an identifier therefor is referred to as a 2D display window table identifier. The 2D display window information may include vertical coordinate range information and horizontal coordinate range information indicating the 2D display window. The vertical coordinate range and the horizontal coordinate range may be changed according to designer's intention.

FIG. 2 is a diagram showing a method of displaying a 3D video signal of a top-bottom mode two-dimensionally according to an embodiment of the present invention.

FIG. 2(*a*) shows a received stereoscopic 3D video signal. In the received 3D video signal, a left image is received in a top region and a right image is received in a bottom region. The size of a screen is 1920*1080.

FIG. 2(*b*) shows a 2D display window for displaying the received 3D video signal two-dimensionally. The 2D display window is determined by vertical coordinate range information and horizontal coordinate range information of a partial region of a whole frame. In FIG. 2(*b*), as the 2D display window information, the vertical coordinate range information of a top region is 0 and the vertical coordinate range information of a bottom region is 539 and the horizontal coordinate range information of a left region is 0 and the horizontal coordinate range information of a right region is 1919. Based on this information, a top region of a 3D video signal of a top-bottom mode is set as the 2D display window.

FIG. 2(*c*) shows the result of cropping the partial region defined by the 2D display window from the 3D video signal. Only an image signal corresponding to the top region in the 3D video signal is cropped. The cropped image has a screen size of 1920*540.

FIG. 2(*d*) shows the result of scaling the cropped image signal. In this case, a reception apparatus may scale the 2D display window using an interpolation or extrapolation method with respect to a vertical coordinate and a horizontal coordinate of the 2D display window.

Since the size of the cropped image signal is half the frame, the cropped image signal is scaled by a ratio desired by a user or an aspect ratio and is displayed on a screen. For example, an image signal scaled to the same size as the initially received 3D video signal has a screen size of 1920*1080. If this image is displayed on the screen, it is possible to obtain the effect of displaying the received 3D video signal two-dimensionally.

FIG. 3 is a diagram showing a method of displaying a 3D video signal of a side-by-side mode two-dimensionally according to an embodiment of the present invention.

FIG. 3(a) shows a received stereoscopic 3D video signal. In the received 3D video signal, a left image is received in a left region and a right image is received in a right region. The size of a screen is 1920*1080.

FIG. 3(b) shows a 2D display window for displaying the received 3D video signal two-dimensionally. The 2D display window is determined by vertical coordinate range information and horizontal coordinate range information of a partial region of a whole frame. In FIG. 3(b), as the 2D display window information, the vertical coordinate range information of a top region is 0 and the vertical coordinate range information of a bottom region is 1079 and the horizontal coordinate range information of a left region is 0 and the horizontal coordinate range information of a right region is 959. Based on this information, a left region of a 3D video signal of a side-by-side mode is set as the 2D display window.

FIG. 3(c) shows the result of cropping the partial region defined by the 2D display window from the 3D video signal. Only an image signal corresponding to the left region in the 3D video signal is cropped. The cropped image has a screen size of 960*1080.

FIG. 3(d) shows the result of scaling the cropped image signal. In this case, a reception apparatus may scale the 2D display window using an interpolation or extrapolation method with respect to a vertical coordinate and a horizontal coordinate of the 2D display window.

Since the size of the cropped image signal is half the frame, the cropped image signal is scaled by a ratio desired by a user or an aspect ratio and is displayed on a screen. For example, an image signal scaled to the same size as the initially received 3D video signal has a screen size of 1920*1080. If this image is displayed on the screen, it is possible to obtain the effect of displaying the received 3D video signal two-dimensionally.

Figure 4:
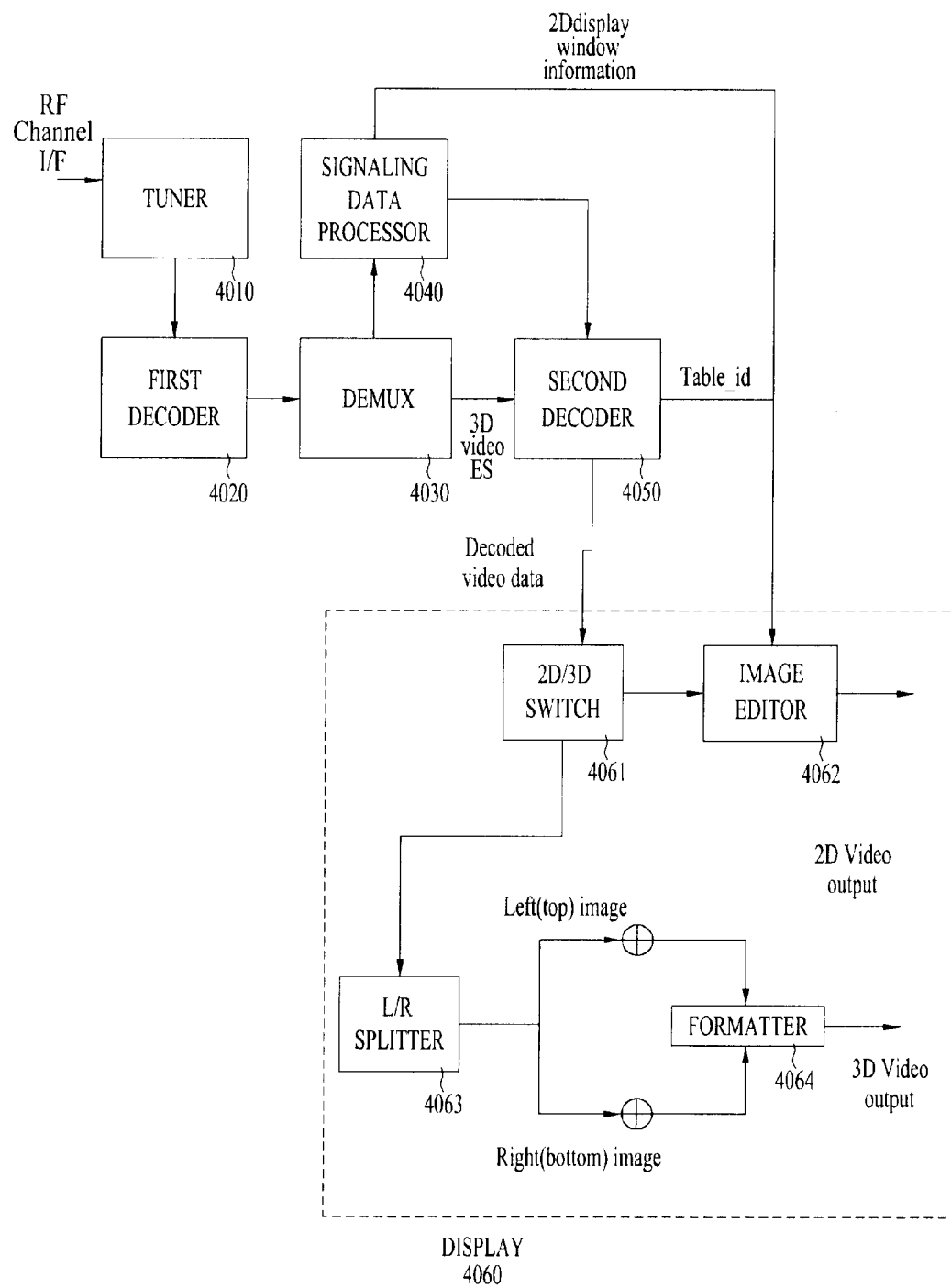
FIG. 4 is a diagram showing components of a broadcast signal reception apparatus for processing a broadcast signal including 2D display window information according to an embodiment of the present invention.

FIG. 4 is a diagram showing components of a broadcast signal reception apparatus for processing a broadcast signal including 2D display window information according to an embodiment of the present invention.

In this embodiment, a 2D display window table including 2D display window information is received in a state of being included in signaling data and an identifier and index for identifying the table is received by a header of a video stream.

The broadcast signal reception apparatus according to the present invention may include a tuner 4010, a first decoder 4020, a demultiplexer 4030, a signaling data processor 4040, a second decoder 4050 and/or a display 4060. The display 4060 may include a 2D/3D switch 4061, an image editor 4062, an L/R splitter 4063 and/or a formatter 4064.

The tuner 4010 may tune to a received broadcast signal, demodulate the tuned broadcast signal, and output the demodulated broadcast signal to the first decoder 4020. In this case, the tuner 4010 may perform vestigial side band (VSB) demodulation or orthogonal frequency division multiplexing (OFDM) demodulation.

The first decoder 4020 decodes the demodulated broadcast signal and outputs the decoded broadcast signal to the demultiplexer 4030. The multiplexer 4030 demultiplexes the decoded broadcast signal, outputs signaling data to the signaling data processor 4040 and outputs a video stream to the second decoder 4050. In the output of the video stream, the demultiplexer 4030 may extract a video stream packet identification (PID) from the signaling data, extract a video stream from the decoded broadcast signal using the video stream PID, and output the video stream to the second decoder 4050.

The signaling data processor 4040 may parse the signaling data and output the parsed signaling data. In this case, the signaling data may include PSI, PSIP, DVB-SI, etc. The signaling data include a 2D display window table including 2D display window information. The signaling data processor 4040 may parse the 2D display window table and store the 2D display window information included in the 2D display window table.

The second decoder 4050 may acquire an identifier 2D_display_window_table_id of the 2D display window table including the 2D display window information from the header of the extracted video stream. The header of the video stream may further include an index 2D_display_window_index indicating an information value to be used on the table in addition to the 2D display window table identifier.

The 2D/3D switch 4061 may confirm whether a 2D mode switching request signal for requesting the extracted video stream to be displayed in 2D is received. The 2D/3D switch is not an essential component of the present invention and need not be included in a reception apparatus which does not support 3D image display.

If the 2D mode switching request signal is received, the image editor 4062 may edit a frame included in the video stream extracted by the second decoder into a partial region using the 2D display window information acquired using the 2D display window table identifier and the 2D display window table. At this time, the image editor may crop and scale the partial region corresponding to the 2D display window and output the scaled cropped partial region.

If the 2D mode switching request signal is not received, the L/R splitter 4063 may split a left image and a right image included in the video stream and output the left image and the right image to the formatter 4064. The formatter 4064 may receive the left image and the right image, perform 3D format conversion, and output a 3D video. The L/R splitter 4063 and the formatter 4064 are not essential components of the present invention and need not be included in a reception apparatus which does not support 3D image display.

In the case of a reception apparatus which does not support 3D image display, even when the 2D mode switching request signal is not received, operation of the image editor 4062 may be performed.

FIG. 5 is a diagram showing a syntax structure including a 2D display window table identifier according to an embodiment of the present invention.

If a video stream is transmitted in a state of being compressed and encoded using an MPEG-2 scheme, the 2D display window information may be transmitted in a state of being in a header region of each picture of the video stream.

If a video stream is transmitted in a state of being compressed and encoded using an H.264/AVC scheme, the 2D display window information may be transmitted through a supplemental enhancement information (SEI) region.

First, if the video stream is transmitted in a state of being compressed and encoded using the MPEG-2 scheme, the 2D display window table identifier 2D_display_window_table_id of the present invention may be transmitted in a state of being included in a header region of an MPEG-2 video stream, more specifically, in user_data( ) 5010 of a picture extension and user data region.

The reception apparatus may receive and decode the picture extension and user data region after receiving a picture header and a picture coding extension. Thereafter, the reception apparatus may acquire user_data( ) 5010.

user_structure( ) may be defined through the value of user_data_start_code and user_data_identifier included in user_data( ) 5010. In particular, in the embodiment of the present invention, user_structure( ) of the case in which a user_data_start_code value is 0x0000 01B2 and a user_data_identifier value is 0x4741 3934 is used.

The reception apparatus may acquire ATSC_user_data( ) syntax 5020 indicated by user_structure( ). Thereafter, the reception apparatus may acquire 2d_display_window_data( ) syntax 5030 using user_data_type_code and user_data_type_structure( ) included in ATSC_user_data( ) syntax 5020. The reception apparatus may decode 2d_display_window_data( ) syntax 5030 and acquire 2d_display_window_table_id which is the 2D display window table identifier of the current video stream and 2d_display_window_index which is the 2D display window index. Hereinafter, the information included in each syntax will be described in detail. FIG. 39 shows another embodiment of the present invention, in which 2d_display_window_data( ) may directly include 2D display window information. The reception apparatus may decode 2d_display_window_data( ) and acquire 2d_window_top_pos, 2d_window_bottom_pos, 2d_window_left_pos, and 2d_window_right_pos which is the 2D display window information of the current video stream, which will be described in detail with reference to FIG. 6.

User_data syntax 5010 may include user_data_start_code, user_data_identifier and user_structure( ), which will be described hereinafter.

User_data_start_code has a fixed value of 0x0000 01B2.

User_data_identifier has a size of 32 bits and may indicate data included in user_structure( ). In the present invention, user_data_identifier has a value of 0x4741 3934 and indicates that user_structure( ) includes ATSC_user_data( ) syntax 5020.

User_structure( ) indicates a data structure having a variable length defined according to the value of user_data_identifier.

ATSC_user_data( ) syntax 5020 may include user_data_type_code and user_data_type_structure( ), which will be described hereinafter.

User_data_type_code has a size of 8 bits and indicates a data type included in user_data_type_structure( ). If the value of user_data_type_code information is 0x10, this indicates that user_data_type_structure( ) includes 2D_display_window_data( ) syntax 5030. For reference, if the value of user_data_type_code is 0x03, this indicates that data included in user_data_type_structure( ) is closed caption data and, if the value of user_data_type_code information is 0x06, this indicates that data included in user_data_type_structure( ) is bar_data( ).

2d_display_window_data( ) syntax 5030 includes 2d_display_window_table_id and 2d_display_window_index, which will be described hereinafter.

2d_display_window_table_id means an identifier of a table containing 2D display window information. At least one 2D display window information table may be present and may indicate information about which table is referred to.

In the present embodiment, the 2D display window table is transmitted in a state of being included in signaling data as a separate table. Accordingly, the 2D display window table may be identified using 2d_display_window_table_id to acquire the 2D display window information included in the 2D display window table.

2d_display_window_index indicates an information value to be used on a table specified by 2d_display_window_table_id.

The above configuration may be used when a plurality of 2D display window tables may be included in one 3D service. If only one 2D display window table is allowed to be included in one service, 2d_display_window_table_id may be omitted and only 2d_display_window_index may be used.

If the video stream is transmitted in a state of being compressed and encoded using the H.264/AVC scheme, the reception apparatus may parse an AVC NAL unit and confirm an SEI payloadType value. If the value of SEI payloadType is 4, the reception apparatus may acquire user_identifier information and user_structure( ) information included in user_data_registered_itu_t_35( ) syntax 5011. The SEI region according to the present invention may include supplementary information which is not essential to a process of decoding a video coding layer (VCL) and include timing information of each picture associated with a hypothetical reference decoder (HRD), information about a pan/scan function (a function for reading and displaying a part of a decoded image), information necessary to perform random access, information independently defined by a user, etc. According to the present invention, the SEI may perform the same function as the picture extension and user data region of MPEG-2 and may be located at the same location as the picture extension and user data region. In addition, user_identifier information and user_structure( ) information may indicate ASFD bar data or caption data according to the values thereof, which may be changed according to designer's intention.

The reception apparatus acquires ATSC_user_data( ) 5020 included in user_structure( ) information and confirms that the data is 2D display window information using user_data_type_code information included in ATSC_user_data( ) 5020.

In addition, similarly to MPEG-2, the reception apparatus may read user_structure( ) corresponding to 0x4741 3934 which is the value of user_data_identifier information and acquire data 2d_display_window_data( ) 5030 which is data having user_data_type_code of 0x10. The reception apparatus may 2d_display_window_data( ) 5030 and acquire a 2d_display_window_table_id which is a 2D display window table identifier of the current video stream and 2d_display_window_index which is a 2D display window index. The subsequent operation is equal to the above-described MPEG-2 and thus a description thereof will be omitted.

User_data_registered_itu_t_35( ) syntax 5011 may include itu_t_t35_country_code, itu_t_t35_provider_code, user_identifier and user_structure( ) information. Itu_t_t35_country_code information has a fixed size of 8 bits, and itu_t_t35_provider_code information has a fixed size of 16 bits. User_identifier and user_structure( ) are equal to user_data_identifier and user_structure( ) of the above-described MPEG-2 and a description thereof will be omitted.

FIG. 6 is a diagram showing a syntax structure of 2d_display_window_table_section( ) which is a 2D display window table including 2D display window information according to an embodiment of the present invention.

2d_display_window_table_section( ) syntax may include table_ID, version_number, section_length, number_of_items, index_value, 2d_window_top_pos, 2d_window_bottom_pos, 2d_window_left_pos, and 2d_window_right_pos, which will be described hereinafter.

Table_ID has a size of 8 bits and identifies to which table the section belongs. In the embodiment of the present invention, this indicates a D display window table including 2D display window information.

Version_number has a size of 5 bits and indicates the version of the section. This value is incremented by one whenever the content of the component included in the section is changed.

Section_length has a size of 12 bits and indicates the number of bytes which remain from a next field to the last field of the section.

Number_of_items has a size of 16 bits and indicates the number of pieces of 2D display window information included in the table.

Index_value has a size of 16 bits and indicates an index value of the 2D display window information included in the table. If the section is forced not to be split into one or more, this index value may be omitted while a zero-based index is used. In this case, the index value is automatically assigned according to for-loop.

2d_window_top_pos and 2d_window_bottom_pos each has a size of 16 bits and indicates the vertical coordinate range of the 2D display window within the picture corresponding to each index.

2d_window_left_pos and 2d_window_right_pos each has a size of 16 bits and indicates the horizontal coordinate range of the 2D display window within the picture corresponding to each index.

In addition, several tables for the same table_id may be received and may be distinguished using a version_number field. That is, if only the version_number field is different, data for filling an index omitted from the table may be received and updated or revised data for the existing index may be received. That is, the 2D display window table is identified using table_id and, if the version_number field is different, the reception apparatus updates data for the same table_id.

The 2D display window table may be transmitted through an elementary stream (ES) specified by a base PID for transmission of PSID data in case of ATSC or a separate PDI may be assigned through a master guide table (MGT) and the 2D display window table may be transmitted through an independent ES.

The same is true in case of DVB. The 2D display window table may be transmitted in a state of being carried in one of PIDs defined such that the existing DVB-SI is used or a new PID may be assigned and used.

The above table may be configured without being associated with a 3D service in the table. In consideration that the table ID is dynamically assigned, it is preferable that a separate PID is assigned and the table is transmitted through the independent ES, in order to distinguish between this table and another private section table.

Unlike the above-described method, only one 2D display window table may be allowed per service.

FIG. 7 is a diagram showing a syntax structure of 2d_display_window_table_section( ) including 2D display window information according to an embodiment of the present invention.

2d_display_window_table_section( ) syntax may include table_ID, section_syntax_indicator, private_indicator, section_length, source_id, version_number, current_next_indicator, section_number, last_section_number, protocol_version, number_of_items, index_value, 2d_window_top_pos, 2d_window_bottom_pos, 2d_window_left_pos, and 2d_window_right_pos, which will be described hereinafter. A repeated description of FIG. 6 will be omitted.

Section_syntax_indicator has a size of 1 bit and indicates that an MPEG-2 private_section table is a long form if the value thereof is 1.

Private_indicator has a size of 1 bit and the value thereof is fixed to 1.

Source_id has a size of 16 bits and specifies a source id of a service to which 2D display window information included in this table is applied.

Current_next_indicator has a size of 1 bit and the value thereof is set to 1 if the section is currently applicable and is set to 0 if the section is not currently applicable.

Section_number has a size of 8 bits and indicates the number of sections. Section_number has a value of 0x00 in case of a first section and is incremented by one.

Last_section_number has a size of 8 bits and indicates the number of the last section, that is, a section having a highest section_number.

Protocol_version has a size of 8 bits and indicates the version of the protocol. Currently, the value thereof is fixed to 0.

If the 2D display window table of FIG. 7 is used, one 2D display window table may be provided per service (a virtual channel in case of ATSC and a service in case of DVB). The reception apparatus must parse this table per service, maintain information, and provide the information to the video decoder in advance or at the request of the video decoder.

In this case, since Table_ID is separately assigned for the 2D display window table, a PID for transmission of this table is not newly assigned and the existing PID may be used. In this case, since each table can be identified by source_id, 2d_display_window_table_id may be omitted from 2d_display_window_data( ) of FIG. 5, in order to refer to this table.

Figure 8:
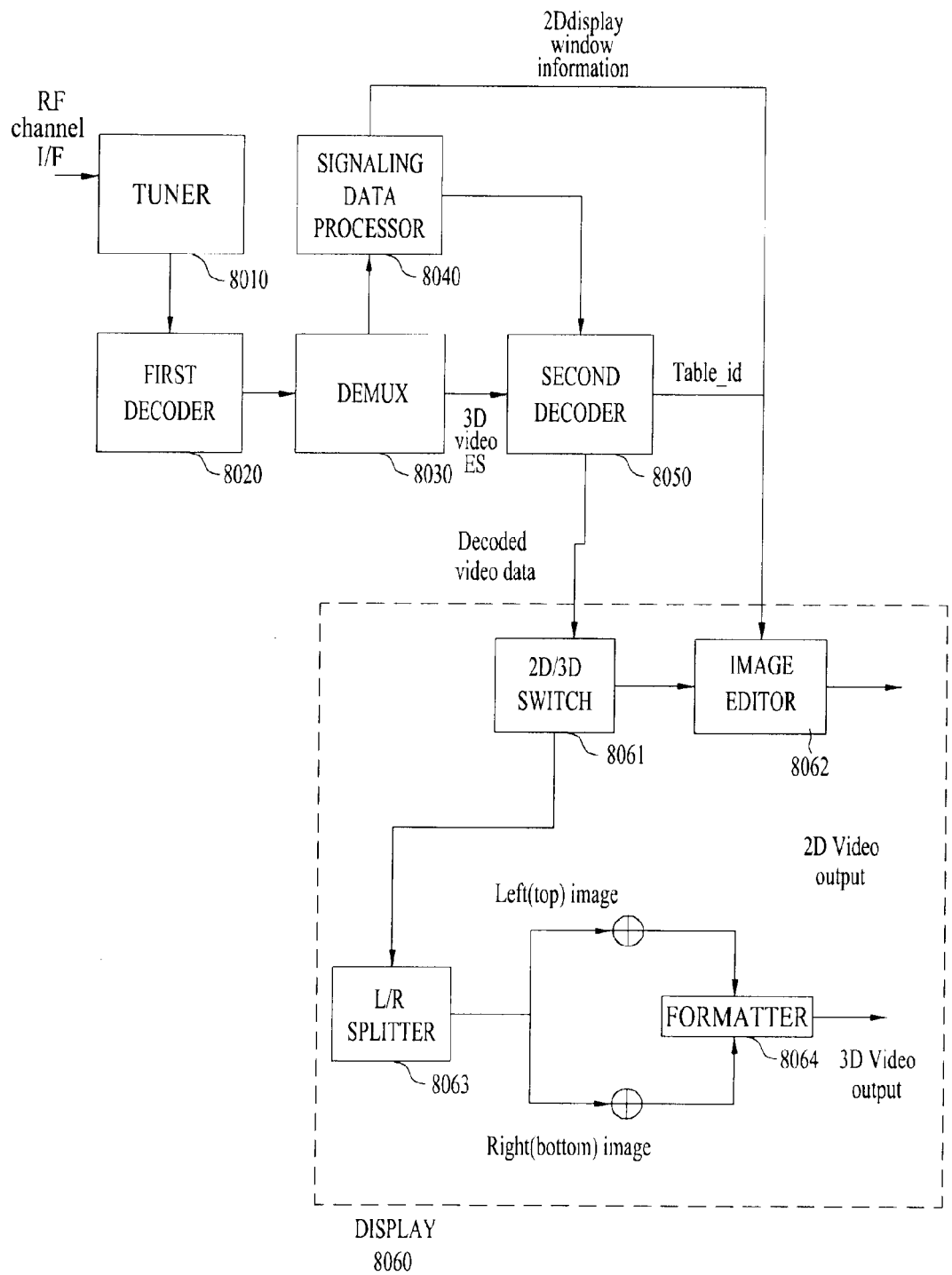
FIG. 8 is a diagram showing components of a broadcast signal reception apparatus for processing a broadcast signal including 2D display window information according to an embodiment of the present invention.

FIG. 8 is a diagram showing components of a broadcast signal reception apparatus for processing a broadcast signal including 2D display window information according to an embodiment of the present invention.

In this embodiment, 2D display window information is received in a state of being included in the existing service information (SI) table included in signaling data or is received by a separate table included in signaling data.

The broadcast signal reception apparatus according to the present invention may include a tuner 8010, a first decoder 8020, a demultiplexer 8030, a signaling data processor 8040, a second decoder 8050 and/or a display 8060. The display 8060 may include a 2D/3D switch 8061, an image editor 8062, an L/R splitter 8063 and/or a formatter 8064.

The tuner 8010 may tune to a received broadcast signal, demodulate the tuned broadcast signal, and output the demodulated broadcast signal to the first decoder 8020. In this case, the tuner 8010 may perform vestigial side band (VSB) demodulation or orthogonal frequency division multiplexing (OFDM) demodulation.

The first decoder 8020 decodes the demodulated broadcast signal and outputs the decoded broadcast signal to the demultiplexer 8030. The multiplexer 8030 demultiplexes the decoded broadcast signal, outputs signaling data to the signaling data processor 8040 and outputs a video stream to the second decoder 8050. In the output of the video stream, the demultiplexer 8030 may extract a video stream packet identification (PID) from the signaling data, extract a video stream from the decoded broadcast signal using the video stream PID, and output the video stream to the second decoder 8050.

The signaling data processor 8040 may parse the signaling data and output the parsed signaling data. In this case, the signaling data may include PSI, PSIP, DVB-SI, etc. The signaling data include an SI table or a 2D display window table including 2D display window information. The signaling data processor 8040 may parse the SI table or the 2D display window table and acquire the 2D display window information included in the 2D display window table. The SI table may include an event information table (EIT), a service description table (SDT), a terrestrial virtual channel table (TVCT) or a program map table (PMT).

The second decoder 8050 may decode the video stream received from the demultiplexer 8030 and output the decoded video stream.

The 2D/3D switch 8061 may confirm whether a 2D mode switching request signal for requesting the extracted video stream to be displayed in 2D is received. The 2D/3D switch is not an essential component of the present invention and need not be included in a reception apparatus which does not support a 3D image display.

If the 2D mode switching request signal is received, the image editor 8062 may edit a frame included in the video stream decoded by the second decoder 8050 into a partial region using the 2D display window information. At this time, the image editor may crop and scale the partial region corresponding to the 2D display window and output the scaled cropped partial region.

If the 2D mode switching request signal is not received, the L/R splitter 8063 may split a left image and a right image included in the video stream and output the left image and the right image to the formatter 8064. The formatter 8064 may receive the left image and the right image, perform 3D format conversion, and output a 3D video. The L/R splitter 8063 and the formatter 8064 are not essential components of the present invention and need not be included in a reception apparatus which does not support a 3D image display.

In case of a reception apparatus which does not support 3D image display, even when the 2D mode switching request signal is not received, operation of the image editor 8062 may be performed.

FIG. 9(*a*) is a diagram showing a syntax structure of 2d_display_window_descriptor( ) including 2D display window information according to an embodiment of the present invention. The information included in 2d_display_window_descriptor( ) may provide region information of a part to be output in a 2D mode within frame-compatible 3D video.

The descriptor may include 2D display window information and may be transmitted in a state of being included in an SI table. The SI table may include an event information table (EIT), a service description table (SDT), a terrestrial virtual channel table (TVCT) or a program map table (PMT).

2d_display_window_descriptor( ) syntax may include descriptor_tag, descriptor_length, 2d_window_top_pos, 2d_window_bottom_pos, 2d_window_left_pos and 2d_window_right_pos.

Hereinafter, the information will be described.

Descriptor_tag has a size of 8 bits and serves as an ID of a descriptor. Descriptor_tag is assigned an empty value of ATSC A/65 and is assigned an empty value of DVB-SI in case of DVB. This descriptor indicates a viewing geometry parameter descriptor.

Descriptor_length has a size of 8 bits and includes information about the number of bytes included in the descriptor.

2d_window_top_pos and 2d_window_bottom_pos each has a size of 16 bits and indicates the vertical coordinate range of the 2D display window within the picture corresponding to each index.

2d_window_left_pos and 2d_window_right_pos each has a size of 16 bits and indicates the horizontal coordinate range of the 2D display window within the picture corresponding to each index.

Accordingly, the signaling data processor 8040 may parse 2d_display_window_descriptor( ) included in the above-described SI table to acquire the 2D display window information.

FIG. 9(*b*) is a diagram showing a syntax structure of 2d_display_window_descriptor( ) including a 2D display window table identifier according to an embodiment of the present invention.

The descriptor may include a 2D display window table identifier or a 2D display window index and may be transmitted in a state of being included in an SI table. The SI table may include an event information table (EIT), a service description table (SDT), a terrestrial virtual channel table (TVCT) or a program map table (PMT).

2d_display_window_descriptor( ) syntax include descriptor_tag, descriptor_length, 2d_display_window_table_id and 2d_display_window_index.

A repeated description of FIG. 9(*a*) will be omitted and the information will be described hereinafter.

2d_display_window_table_id indicates the identifier of a table containing 2D display window information. At least one 2D display window information table may be present and may indicate information about which table is referred to.

2d_display_window_index indicates an information value to be used on a table specified by 2d_display_window_table_id.

In the present embodiment, the 2D display window information is included in a separate table (a 2D display table) and is transmitted as signaling data. The separate table has the form shown in FIGS. 6 and 7 as an embodiment. Accordingly, the 2D display window table is identified using 2d_display_window_table_id to acquire 2D display window information included in the 2D display window table.

For syntaxes which refer to the table, the decoder may be informed of preset table information in advance or the table may be transmitted to the decoder.

The reserved region of the descriptors of FIGS. 9(*a*) and 9(*b*) may be used as a descriptor_tag_extension field when being transmitted through DVB.

FIG. 10 is a diagram showing a syntax structure of a terrestrial virtual channel table (TVCT) including 2d_display_window_descriptor( ) according to an embodiment of the present invention.

The TVCT includes attributes of virtual channels included in a transport stream in PSIP of ATSC. In order to signal 2D display window information, 2d_display_window_descriptor( ) may be transmitted in a state of being included in the TVCT. At this time, 2d_display_window_descriptor( ) may be transmitted in a state of being included in a first descriptor loop of the TVCT. 2d_display_window_descriptor( ) included in the TVCT provides 2D display window information of a currently broadcast stream.

Information included in the TVCT will be described.

The value of a table_id field indicates the type of the table section. In order to indicate the TVCT, the value thereof shall be 0xC8.

A section_syntax_indicator field has 1 bit and the value thereof is fixed to 1.

A private_indicator field is set to 1.

A section_length field has 12 bits and the first two bits are 00. This field indicates the number of bytes of the section and indicates the length from a next field to CRC. The value of this field does not exceed 1021.

A transport_stream_id has 16 bits and indicates an MPEG-2 transport stream (TS) ID. By this field, the TVCT is distinguished from another TVCT.

A version_number field indicates the version of a virtual channel. This field is incremented by one whenever the VCT is changed. If the version value reaches 31, a next version value becomes 0. The value of this field is necessarily equal to the value of the same field of an MGT.

A current_next_indicator field has 1 bit and the value thereof is set to 1 if the VCT is currently applicable. If the value thereof is set to 0, this indicates that the VCT is not applicable and a next table is valid.

A section_number field indicates the number of sections. The value of a first section the TVCT is 0x00 and the value thereof is incremented by one per additional section.

A last_section_number field indicates the number of the last section, that is, the number of the section having a highest section_number in the TVCT.

A protocol_version field serves to allow another table type different from that defined in the current protocol in the future. In the current protocol, only 0 is valid. A value other than 0 will be structurally used in the subsequent version for another table.

A num_channels_in_section field indicates the number of virtual channels in the VCT section. The value thereof is restricted by the section length.

A short_name field indicates the name of the virtual channel.

A major_channel_number field has 10 bits and indicates a major channel number of a virtual channel defined in corresponding order within a for-loop. Each virtual channel includes a major channel number and a minor channel number. The user may use the major channel number along with the minor channel number with respect to the virtual channel. The major channel number has values of 1 to 99 and the major/minor channel number pair does not have a repeated value within the TVCT.

The minor_channel_number field has 10 bits and has values of 0 to 999. The minor channel number functions as a two-part channel number along with the major channel number. If a service type is ATSC_digital_television or ATSC_audio_only, the minor channel number has values of 1 to 99. The major/minor channel number pair does not have a repeated value within the TVCT.

A modulation_mode field indicates a modulation mode of a transport carrier associated with the virtual channel.

The value of a carrier frequency field is 0. The carrier frequency is allowed to be confirmed using this field.

A channel_TSID field has values of 0x0000 to 0xFFFF and is an MPEG-2 TSID associated with a TS for transferring an MPEG-2 program referred to by this virtual channel.

A program_number field associates a virtual channel defined in the TVCT with an MPEG-2 PROGRAM ASSOCIATION and TS PROGRAM MAP table.

An ETM_location field indicates presence and location of an extended text message (ETM).

An access_controlled field is a 1-bit Boolean flag, indicates an event associated with the virtual channel is accessed and controlled if the value thereof is 1, and indicates that the event is not accessed and controlled if the value thereof is 0.

A hidden field is a 1-bit Boolean flag. If the value thereof is 1, even when the user directly inputs the number, access is not allowed. A hidden virtual channel is skipped if the user performs channel surfing and appears as not being defined.

A hide_guide field is a Boolean flag. If the value thereof is set to 0 with respect to a hidden channel, the virtual channel and event thereof may be displayed on an EPG display. If a hidden bit is not set, this field is ignored. Accordingly, a non-hidden channel and an event thereof belong to the EPG display regardless of the state of the hide_guide bit.

A service_type field confirms the type of a service sent by the virtual channel.

A source_id field confirms a programming source associated with the virtual channel. The source may be any one of video, text, data or audio programming. Source id 0 is a reserved value, has a unique value within a TS for sending the VCT from 0x0001 to 0x0FFF, and has a unique value within a region level from 0x1000 to 0xFFFF.

A descriptors_length field indicates the length of the descriptor which follows the virtual channel in bytes.

A descriptor need not be included in descriptor( ) or one or more descriptors may be included in descriptor( ).

An additional_descriptors_length field indicates the total length of a following VCT descriptor list in bytes.

A CRC_32 field indicates a CRC value to become a zero output of a register within a decoder.

The present invention may be used when 2d_display_window_descriptor is transmitted in a state of being included in the TVCT and the same information is consistently maintained with respect to the service as 2D display window information. That is, if the same region is not changed with time with respect to the service and is used as 2D display window information, the same region may be maintained with respect to the same service without updating the information. Thus, data transfer efficiency is excellent.

FIG. 11 is a diagram showing a syntax structure of a program map table (PMT) including 2d_display_window_descriptor( ) according to an embodiment of the present invention.

The PMT provides mapping between a program number and a program element. In order to signal 2D display window information, 2d_display_window_descriptor( ) may be transmitted in a state of being included in the PMT. At this time, 2d_display_window_descriptor( ) may be transmitted in a state of being included in a first or second descriptor loop of the PMT. 2d_display_window_descriptor( ) included in the PMT provides 2D display window information for a currently broadcast stream.

The PMT includes the following fields.

A table_id field is an 8-bit field and TS_program_map_section is always set to a value of 0x02.

A section_syntax_indicator field has 1 bit and the value thereof is set to 1.

A section_length field has 12 bits and the first two bits are 00. This field indicates the number of bytes of the section and indicates the length from a next field to CRC. The value of this field does not exceed 1021.

A program_number field has 16 bits and indicates to which program program_map_PID is applied. Definition of one program is transmitted by only one TS_program_map_section. This indicates that program definition cannot exceed 1016.

A version_number field indicates the version of a virtual channel. This field is incremented by one whenever the VCT is changed. If the version value reaches 31, a next version value becomes 0. The value of this field is necessarily equal to the value of the same field of an MGT.

A current_next_indicator field has 1 bit and the value thereof is set to 1 if the VCT is currently applicable. If the value thereof is set to 0, this indicates that the VCT is not applicable and a next table is valid.

The value of a section_number field is set to 0x00.

The value of a last_section_number field is set to 0x00.

A PCR_PID field has 13 bits and indicates a PID of a TS including a PCR field which is valid with respect to the program described by the program number.

A program_info_length field has 12 bits and the first two bits have a value of 00. The remaining 10 bits indicates the descriptor which follows this field in bytes.

A stream_type field has 8 bits and indicates the type of a program element transmitted by packets having a PDI value of a base PID.

Elementary_PID has 13 bits and indicates a PID of a TS including an associated program element.

An ES_info_length field has 12 bits and the first two bits are 00. The remaining 10 bits indicates the descriptor which follows this field in bytes.

A CRC_32 field indicates a CRC value to become a zero output of a register within a decoder.

The present invention may be used when 2d_display_window_descriptor is transmitted in a state of being included in the PMT and the same information is consistently maintained with respect to the service as 2D display window information. That is, if the same region is not changed with time with respect to the service and is used as 2D display window information, the same region may be maintained with respect to the same service without updating the information. Thus, data transfer efficiency is excellent.

FIG. 12 is a diagram showing a syntax structure of an service description table (SDT) including 2d_display_window_descriptor( ) according to an embodiment of the present invention.

The SDT describes services included in a specific transport stream in DVB-SI. In order to signal 2D display window information, 2d_display_window_descriptor( ) may be transmitted in a state of being included in the SDT. At this time, 2d_display_window_descriptor( ) may be transmitted in a state of being included in a first descriptor loop of the SDT. 2d_display_window_descriptor( ) included in the SDT provides 2D display window information for a currently broadcast stream.

A table_id field is an 8-bit field and indicates that this section belongs to a service description table.

A section_syntax_indicator field has 1 bit and the value thereof is set to 1.

A section_length field has 12 bits and the first two bits are 00. This field indicates the number of bytes of the section including a next field of this field to CRC. The value of this field does not exceed 1021 and the total section length is a maximum of 1024 bytes.

A transport_stream_id field is a 16-bit field and serves as a label for identifying a TS.

A version_number field is a 5-bit field and indicates a version number of sub_table. This field is incremented by one whenever sub_table is changed. If the version value reaches 31, a next version value becomes 0.

A current_next_indicator field has 1 bit and the value thereof is set to 1 if a sub_table is currently applicable. If the value thereof is set to 0, this indicates that the sub_table is not applicable and a next table is valid.

A section_number field has 8 bits and indicates the number of sections. A first section has a value of 0x00, and the section is incremented by one whenever the section having the same table_id, the same transport_stream_id and the same original_network_id are added.

A last_section_number field has 8 bits and indicates the number of the last section of a sub_table (that is, a highest section_number) of the TVCT.

An original_network_id field is a 16-bit field and indicates a label for identifying a network_id of a transmission system.

A service_id field is a 16-bit field and serves as a label for identifying a service included in the TS. This is equal to a program_number of a program_map_section.

An EIT_schedule_flag is a 1-bit field, indicates that EIT schedule information for the service is included in the current TS if the value thereof is set to 1 and indicates that EIT schedule information for the service is not included if the value thereof is set to 0.

An EIT_present_following_flag is a 1-bit field, indicates that EIT_present_following information for the service is included in the current TS if the value thereof is set to 1 and indicates that EIT_present_following information for the service is not included in the current TS if the value thereof is set to 0.

A running_status field is a 3-bit field and indicates the state of the service.

A free_CA_mode is a 1-bit field, indicates that all elementary streams of the service are not scrambled if the value thereof is set to 0, and indicates that all elementary streams of the service are scrambled if the value thereof is set to 1.

A descriptors_loop_length field is a 12-bit field and indicates the total length of the following descriptor in bytes.

A CRC_32 field is a 32-bit field and indicates a CRC value to become a zero output of a register within a decoder.

The present invention may be used when 2d_display_window_descriptor is transmitted in a state of being included in the SDT and the same information is consistently maintained with respect to the service as 2D display window information. That is, if the same region is not changed with time with respect to the service and is used as 2D display window information, the same region may be maintained with respect to the same service without updating the information. Thus, data transfer efficiency is excellent.

FIGS. 13 and 14 are diagrams showing a syntax structure of an event information table (EIT) including 2d_display_window_descriptor( ) according to an embodiment of the present invention in ATSC PSIP and DVB-SI.

The EIT includes information about a virtual channel or each event defined in a service. In order to signal 2D display window information, 2d_display_window_descriptor( ) may be transmitted in a state of being included in the EIT.

The information included in the EIT of ATSC PSIP of FIG. 13 will now be described.

A table_id field is an 8-bit field, is set to 0xCB, and indicates that the section belongs to the EIT.

A section_syntax_indicator field is a 1-bit field and the value thereof is set to 1. This means that the section follows a generic section syntax after the section length field.

A private_indicator field is a 1-bit field and is set to 1.

A section_length field is a 12-bit field and indicates the number of bytes from a next field of this field to a section including a CRC_32 field. The value of this field does not exceed 4093.

A source_id field is a 16-bit field and indicates a source_id of a virtual channel for sending an event described in this section.

A version_number field is a 5-bit field and indicates the version number of EIT-i. The version number is incremented by one (modulo 32) if any field of EIT-I is changed. If i and j are different, the version number of EIT-i and the version number of EIT-j are unrelated. The value of this field has the same value as the MGT.

A current_next_indicator field is a 1-bit indicator and is always set to 1 with respect to the EIT section. Currently, the EIT is always applicable.

A section_number field is an 8-bit field and indicates the number of sections.

A last_section_number field is an 8-bit field and indicates the number of the last section.

A protocol_version field serves to allow a table type different from that defined in the current protocol in the future. In the current protocol, only 0 is valid. A value other than 0 will be structurally used in the subsequent version for another table.

A num_events_in_section field indicates the number of events in the EIT section and indicates that an event is not defined in this section if the value thereof is 0.

An event_id field indicates the ID of the described event. This is used as a part of ETM_id.

A start_time field is a 32-bit field and indicates a start time of an event in GPS seconds after 1980.1.6. 00:00:00 UTC. In any virtual channel, the value of start_time cannot be smaller than end_time of a previous event. Here, end_time is defined to a value obtained by the length of the event length_in_seconds to the start_time of the event.

An ETM_location field is a 2-bit field and indicates presence and location of an extended text message (ETM).

A length_in_seconds field indicates the duration of this event in seconds.

A title_length field indicates the length of title_text( ) in bytes and indicates that there is no title of the event if the value thereof is 0.

A title_text( ) field indicates the title of the event of a multiple string structure format.

A descriptors_length field indicates the total length of the following event descriptor in bytes. 0 or more descriptors are included in the EIT by for-loop included in descriptor( ). The type of the descriptor defined to be used in the EIT may include content_advisory_descriptor( ), the caption_service_descriptor( ), the AC-3 audio_stream_descriptor( ), etc. 2d_display_window_descriptor( ) of the present invention may be included therein.

A CRC_32 field indicates a CRC value to become a zero output of a register within a decoder.

Information included in the EIT of the DVB-SI of FIG. 14 will now be described.

A table_id field is an 8-bit field and indicates that this section belongs to a service description table.

A section_syntax_indicator field is a 1-bit field and the value thereof is set to 1.

A section_length field is a 12-bit field and indicates the number of bytes from a next field of this field to a section including a CRC. The value of this field does not exceed 4093 and the total length of the section is a maximum of 4096 bytes.

A source_id field is a 16-bit field and serves as a label for identifying a service in the TS. The source_id field has the same value as program_number of program_map_section corresponding thereto.

A version_number field is a 5-bit field and indicates the version number of a sub_table. The version number is incremented by one if the sub_table is changed. If the version number reaches 31, a next version number becomes 0.

A current_next_indicator field has 1 bit and is set to 1 if the sub_table is currently applicable. If this field is set to 0, this indicates that the sub_table is not applicable yet and a next table is valid.

A section_number field is an 8-bit field and indicates the number of sections. A first section has a value 0x00 and the value thereof is incremented by one whenever a section having the same table_id, the same transport_stream_id and the same original_network_id are added.

A last_section_number field is an 8-bit field and indicates the number of the last section (that is, a highest section_number).

A transport_stream_id field is a 16-bit field and serves as a label for distinguishing TSs.

An original_network_id field is a 16-bit field and serves as a label for identifying a network_id of a transmission system.

A segment_last_section_number field is an 8-bit field and indicates the number of a last section of a segment of sub_table. With respect to sub_table which is not divided into segments, this field has the same value as a last_section_number field.

A last_table_id is an 8-bit field and indicates a lastly used table_id.

An event_id field is a 16-bit field and includes an id number representing an event (this is uniquely assigned in service definition).

A start_time field is a 40-bit field and indicates a start time of an event in a universal time, coordinated (UTC) format or a Modified Julian Date (MJD). This field includes 16 bits coded by 16 LSBs and 24 bits coded by 6 digits of 4-bit binary coded decimal (BCD). If the start time is not defined (e.g., NVOD service), all bits are set to 1.

A duration field is a 24-bit field and indicates the duration of an event in minutes or seconds. Accordingly, the duration is expressed as 6 digits of 4-bit BCD and has 24 bits.

A running_status is a 3-bit field and indicates the state of an event. This field is set to 0 in case of an NVOD event.

A free_CA_mode is a 1-bit field, indicates that all element streams of a service are not scrambled if the value thereof is set to 0 and indicates that one or more streams are controlled by a CA system if the value thereof is set to 1.

A descriptors_loop_length field is a 12-bit field and indicates the total length of the following descriptor in bytes.

A CRC_32 field is a 32-bit field and indicates a CRC value for a zero output of a register within a decoder.

The present invention may be used when 2d_display_window_descriptor is transmitted in a state of being included in the EIT and another region is used as a 2D display window in broadcast program units. In addition, by indicating the 2D display window for an event to be broadcast in the future in advance, a necessary parameter can be set in advance or a user can be informed that a part to be used as the 2D display window is defined in advance.

As described above, if the 2D display window information is transmitted in a state of being included in signaling data to be transmitted, a reception apparatus may display a 3D video signal two-dimensionally using the information. Next, an embodiment of the present invention in an IPTV environment will be described. An ITF is an abbreviation for IPTV Terminal Function and is a functional set of a reception apparatus including functional modules necessary to support an IPTV service.

Figure 15:
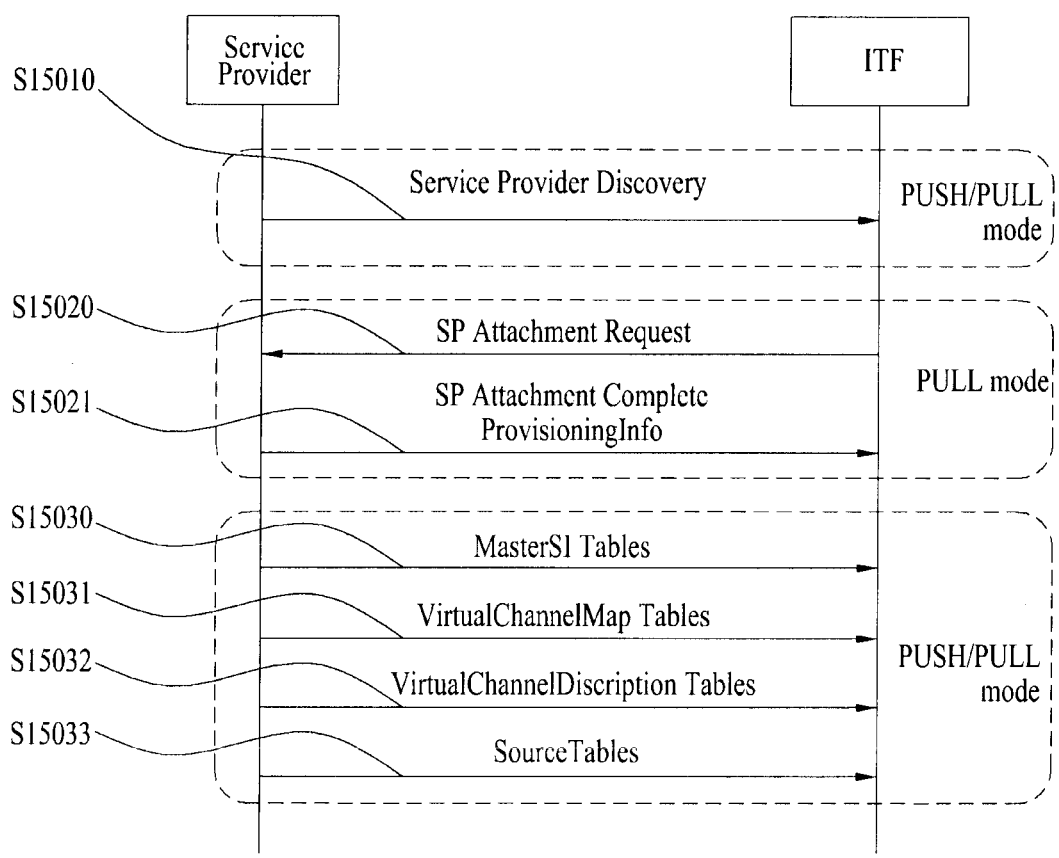
FIG. 15 is a diagram showing an example of IPTV service discovery according to an embodiment of the present invention.

FIG. 15 is a diagram showing an example of IPTV service discovery according to an embodiment of the present invention.

Service provider discovery S15010 is a process of, at service providers for providing IPTV, discovering a server providing information about services thereof. This involves discovering an address list capable of receiving information (SP discovery information) of a per-service-provider service information server, that is, a service discovery (SD) server, using three methods.

First, an address is set in advance or manually. This method follows an address preset in the ITF or an address manually set by a user. Second, there is a DHCP based SP discovery method. This method uses a DHCP option to obtain an address list. Third, there is a DNS SRV based SP discovery method. This method issues a query using a DNS SRV mechanism to obtain an address list.

A server having the address acquired using the above method is accessed, information including a service provider discovery record containing information necessary for per-SP service discovery is received and a service discovery step is performed using the received information. Such data can be provided in a push/pull mode.

An SP attachment server specified by an SPAttachmentLocator on the SP discovery record is accessed to perform an ITF registration procedure (service attachment procedure) (S15020). At this time, information transferred from the ITF to the server may be transferred in the form of an ITFRegistrationInputType record or such information is provided in the form of a query term of an HTTP GET method so as to perform service attachment.

Selectively, after an authentication service server of an SP specified by SPAuthenticationLocator is accessed to perform a separate authentication procedure, service attachment may be performed. In this case, ITF information of a form similar to service attachment may be transmitted to a server so as to perform authentication.

After a service attachment process has been successfully performed, SP attachment complete provisioningInfo is transmitted from the server to the ITF. Here, the transmitted data may have the form of ProvisioningInfoTable (S15021).

The ITF includes and provides the ID and position information thereof in data transmitted to the server in a service attachment process, such as an ITFRegistrationInputType record, and the service attachment server may specify a service, to which the ITF subscribes, based on the ID and position information. Therefore, an address capable of acquiring service information to be received by the ITF is provided in the form of ProvisioningInfoTable. This address is access information of a MasterSI Table (S15030) and a service is configured per subscriber through this method so as to be provided.

Service information is split into a VirtualChannelMap Table (S15031) for providing a master SI Table Record for managing access information and version of VirtualChannelMap and a service list of a package form, VirtualChannelDescriptionTable (S15032) including detailed information of each channel, and SourceTable S15033 including access information for accessing an actual service.

Figure 16:
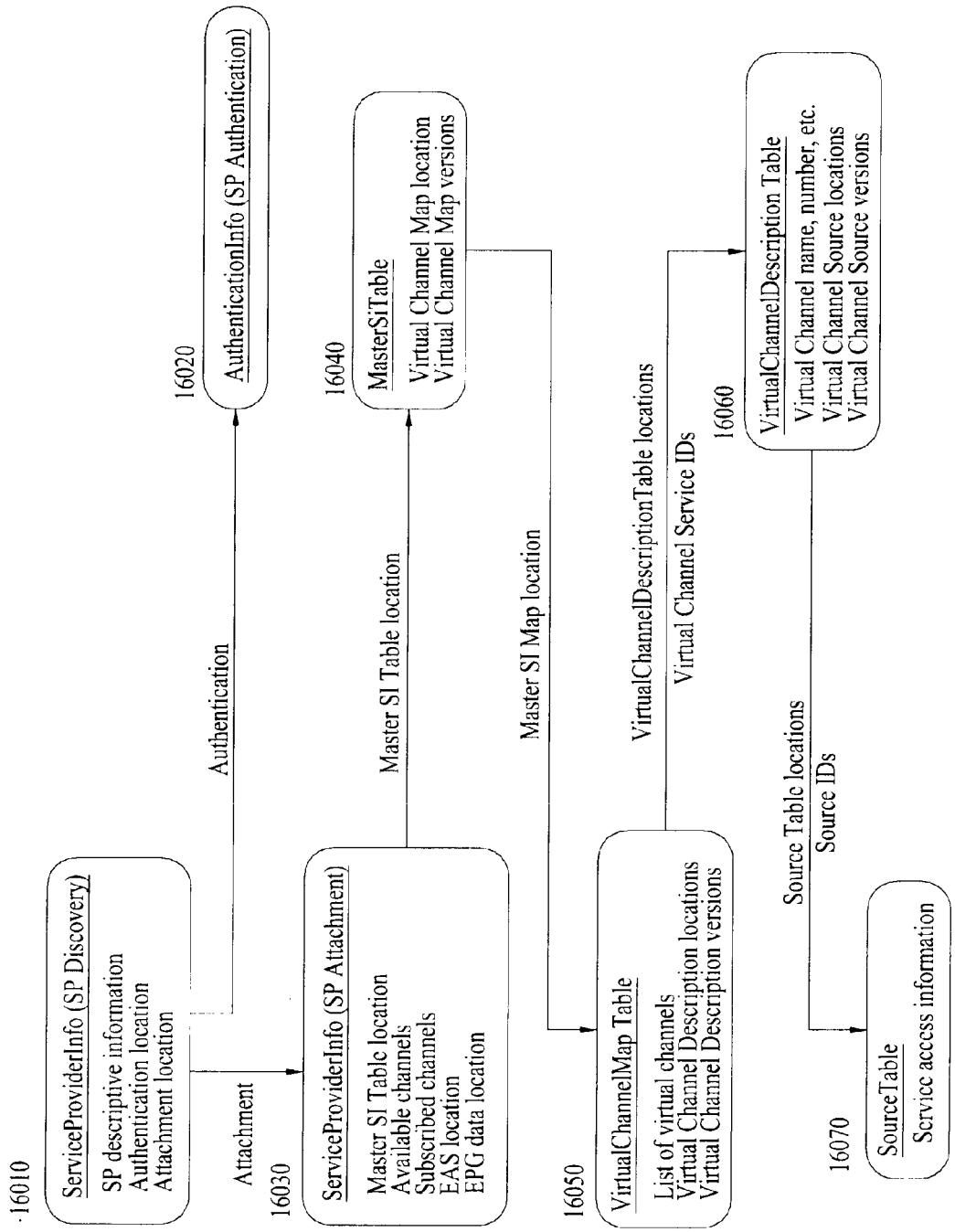
FIG. 16 is a diagram showing an SI table structure of an IPTV service according to an embodiment of the present invention.

FIG. 16 is a diagram showing an SI table structure of an IPTV service according to an embodiment of the present invention, which shows components configuring service information and a relationship between the components.

Service Provider Info 16010 includes SP description information, authentication location information, and attachment location information.

Authentication Info 16020 includes authentication information of a service provider (SP).

Provisioning Info 16030 includes master SI table location information, available channels information, subscribed channels information, EAS location information, and EPG data location information.

Master SI Table Record 16040 includes location information capable of receiving each VirtualChannelMap and version information of each VirtualChannelMap.

Each VirtualChannelMap is uniquely identified by VirtualChannelMapIdentifier and VirturalChannelMapVersion has version information of VirtualChannelMap. If any one of all tables connected by directions denoted by arrows starting from MasterSITable shown in FIG. 16 is changed, such change involves increase of the version number of the table and increase of the version numbers of all high-level tables thereof (including MasterSI table). Accordingly, by monitoring MasterSI Table 16040, the change in the SI table can be immediately confirmed. For example, if SourceTable 16070 is changed, such change increases SourceVersion of SourceTable 16070, thereby changing a VirtualChannelDescription Table 16060 including a reference to Source Table 16070. In such a manner, change in low-level table changes a high-level table to change VirtualChannelMapTable 16050, thereby finally changing MasterSITable 16040.

Only one Master SI Table 16040 may be present in a service provider. However, if the configuration of the service is different per region or subscriber (or subscriber group), in order to provide a service per unit, a separate Master SI Table Record is more efficiently configured. In this case, a service suitable for region and subscription information of a subscriber can be provided using Master SI table 16040 through the service attachment step.

The MasterSITable 16040 Record of FIG. 16 provides a VitrualChannelMap list, which may be uniquely identified by VirtualChannelMapIdentifier. Each VirtualChannelMapTable 16050 may have one or more VirtualChannels, does not include detailed information of a channel in VirtualChannelMap, but specifies a location where the detailed information can be acquired. VirtualChannelDescriptionLocation serves to specify the location of VirtualChannelDescriptionTable 16060 including the detailed information of the channel.

VirtualChannelDescriptionTable 16060 includes detailed information of VirtualChannel and can be found by VirtualChannelDescriptionLocation on VirtualChannelMap.

In specifying the location of the detailed information of each channel through VirtualChannelDescriptionLocation, VirtualChannelServiceID of VirtualChannelDescriptionTable 16060 is a unique identifier for identifying a service corresponding to VirtualChanneldescription. Through this identifier, VirtualChannelDescriptionTable 16060 can be found. If a plurality of VirtualChannelDescriptionTables 16060 is received using a multicast scheme, VirtualChannelDescriptionTable 16060 corresponding to VirtualChannelServiceID is found while continuously receiving tables using the stream.

In case of unicast, VirtualChannelServiceID is transferred to the server as a parameter so as to receive only desired VirtualChannelDescriptionTable 16060.

SourceTable 16070 provides access information (an IP address, a port, an AV codec, a transport protocol, etc.) necessary to access an actual service as per-service source information. Since one source may be used for several VirtualChannel services, it is possible to provide a most flexible structure by dividing and providing the tables in this manner.

MasterSITable 16040, VirtualChannelMapTable 16050, VirtualChannelDescriptionTable 16060, and SourceTable 16070 are transferred through four logically divided flows and any push/pull mode may be used (S15030 to S15033).

MasterSITable 16040 is transmitted in multicast for version management and this stream is always received to monitor version change.

Figure 17:
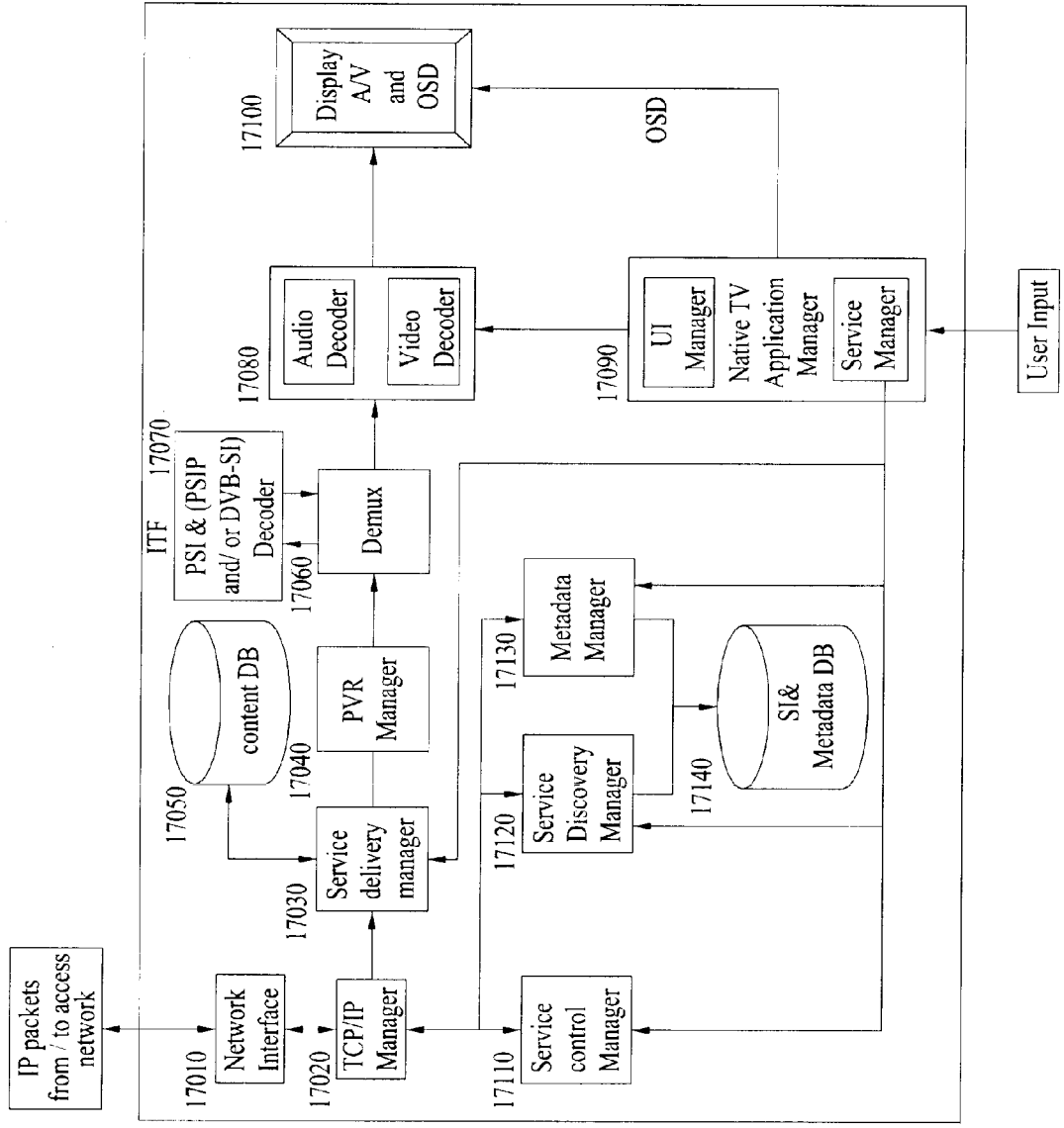
FIG. 17 is a block diagram of an IPTV system according to an embodiment of the present invention.

FIG. 17 is a block diagram of an IPTV system according to an embodiment of the present invention.

An ITF is an abbreviation for IPTV Terminal Function and is a functional set of a reception apparatus including functional modules necessary to support an IPTV service.

A network interface 17010 transmits and receives IPTV packets and belongs to a physical layer and data link layer which is a lowest layer of 7 OSI layers.

An Internet protocol (IP) manager 17020 is responsible for transmitting end-to-end packets and enables each packet to correspond to an adequate protocol manager.

A service delivery manager 17030 is responsible for processing real-time streaming data and downloading content, and is also responsible for retrieving content from a content database.

In an MPEG-2 transport stream (TS), real-time transport protocol (RTP)/RTP control protocol (RTCP) is used. MPEG-2 packets are encapsulated by the RTP.

A service delivery manager 17030 parses RTP packets and sends the parsed transport packets to a demultiplexer 17060. In addition, feedback of network reception quality is transmitted using the RTCP. The MPEG-2 transport packets may be directly delivered using a user datagram protocol (UDP) without the RTP.

For content downloading, an HTTP or FLUTE protocol may be used as a transport protocol.

A PVR manager 17040 is responsible for recording and reproducing live streaming content. All metadata necessary for the recorded content is collected and additional information for better user environment is collected. For example, a thumbnail image, an index, etc. may be included.

A content DB 17050 is a database of recorded content from a live media TV or content transmitted by a content downloading system.

A demultiplexer (DEMUX) 17060 demultiplexes audio, video and a PSI table from input transport packets (TPs). The DEMUX is controlled to demultiplex the PSI table by a PSI decoder 17070 so as to generate and output a PSI table section to the PSI decoder 17070. In addition, the DEMUX is controlled to demultiplex A/V TPs.

The PSI decoder 17070 is a PSI control module, which includes not only a PSI but also a PSIP or a DVB-SI. In the following description, the PSI decoder includes the PSI.

The PSI decoder 17070 sets and sends PIDs for a PSI table to the DEMUX 17060. A PSI private section received from the DEMUX 17060 is decoded and the decoded result is used to set audio and video PIDs and demultiplex the received TPs.

An audio and video decoder 17080 decodes audio and video elementary stream (ES) packets.

An A/V and OSD display 17100 is controlled to receive audio and video data from the audio and video decoder 17080 and output the audio and video data through a screen and a speaker. The A/V and OSD display is controlled to display on screen display (OSD) graphic data.

The display crops and scales 3D video according to the 2D display window of the present invention and outputs the 2D video or splits L/R image and outputs 3D video through a formatter.

A native application manager and user interface (UI) manager 17090 supports a graphic user interface (GUI) displayed on a TV screen. The native application manager and UI manager is responsible for receiving user input using a remote controller or a front panel and managing the state of the TV system.

A service manager 17090 controls other all managers associated with the service. The service manager may become a service control manager 17110, a service transmission manager 17120, an IMS gateway open IPTV forum (IG-OITF) client, a service discovery manager 17120 and a metadata manager 17130. In addition, the service manager is responsible for providing an IPTV service.

The service control manager 17110 is responsible for selecting and controlling a service and managing a session. In order to select a live service, an Internet group management protocol (IGMP) or a real time streaming protocol (RTSP) is used and, in order to select video on demand (VOD) content, an RTSP is used. If an IP multimedia subsystem (IMS) is used, an SIP is used in order to initialize or manage a session through an IMS gateway.

In order to control on-demand transmission or TV broadcast or audio broadcast transmission, an RTSP is used. The RTSP uses a continuous TCP connection and supports trick mode control with respect to real time media streaming.

The service discovery manager 17120 discovers an IPTV service through an interactive IP network. All information about a selectable service is provided.

The metadata manager 17130 manages metadata in association with a metadata DB.

An SI & metadata DB 17140 provides a database of service discovery information and metadata associated with services.

Figure 18:
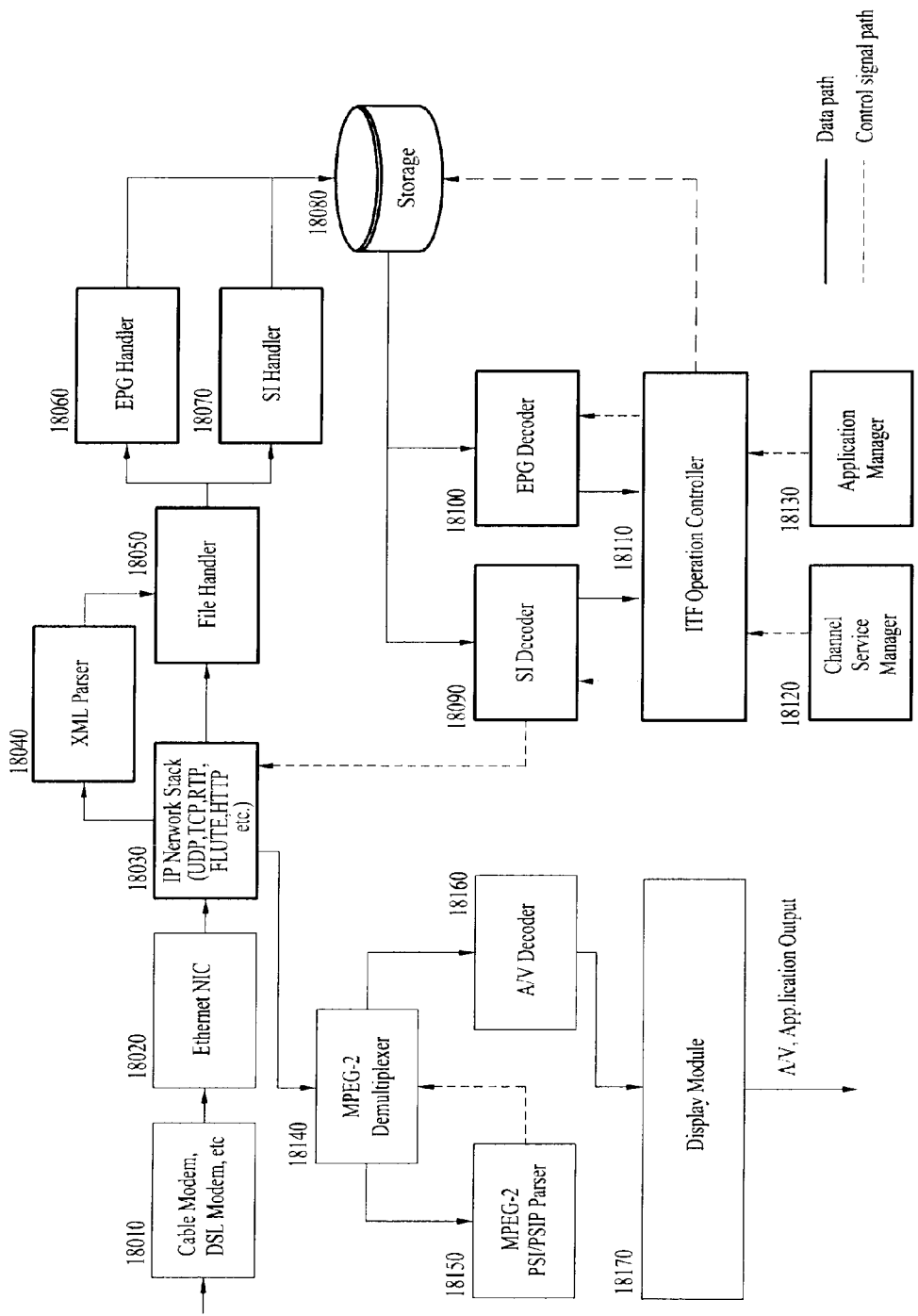
FIG. 18 is a block diagram of each module of an ITF according to an embodiment of the present invention.

FIG. 18 is a block diagram of each module of an ITF according to an embodiment of the present invention.

Blocks of the present invention are denoted by a thick line and a solid-line arrow denotes a data path and a dotted-line arrow denotes a control signal path. Each component will now be described.

A cable modem and DSL modem 18010 demodulates a signal transmitted through an interface and physical medium connected between the ITF and an IP network at a physical layer and restore a digital signal.

An Ethernet NIC 18020 restores a signal received through a physical interface to IP data.

An IP network stack 18030 processes each layer according to an IP protocol stack.

An XML parser 18040 parses an XML document of received IP data.

A file handler 18050 handles data received in the form of a file through FLUTE, etc. of received IP data.

An EPG handler 18060 handles a part corresponding to IPTV EPG data of data received in the form of a file and stores the handled part in a storage 18080.

An SI handler 18070 handles a part corresponding to IPTV SI data of data received in the form of a file and stores the handled part in the storage 18080.

The storage 18080 stores data necessary to store SI, EPG, etc.

An SI decoder 18090 retrieves and analyzes SI data from the storage 18080 and restores necessary information, if channel map information is necessary.

An EPG decoder 18110 retrieves and analyzes EPG data from the storage 18080 and restores necessary information, if EPG information is necessary.

An ITF operation controller 18110 is a main controller for controlling operation of the ITF such as channel change, EPG display, etc.

A channel service manager 18120 receives user input and manages a channel change operation.

An application manager 18130 receives user input and manages an application service such as EPG display.

An MPEG-2 DEMUX 18140 extracts MPEG-2 transport stream data from a received IP datagram and sends the MPEG-2 transport stream data to a corresponding module according to PID.

An MPEG-2 PSI/PSIP parser 18150 extracts and parses PSI/PSIP data including information capable of accessing a program element, such as PID of each data (audio/video, etc.) of an MPEG-2 transport stream in a received IP datagram.

An audio/video decoder 18160 decodes received audio and video data and sends the decoded audio and video data to a display module.

A display module 18170 combines and processes a received audio/video signal and OSD signal and outputs the processed data through a screen and a speaker. According to the embodiment of the present invention, the display module crops and scales 3D video according to the 2D display window of the present invention and outputs the 2D video on a 2D screen or splits L/R image and outputs 3D video through a formatter.

Figure 19:
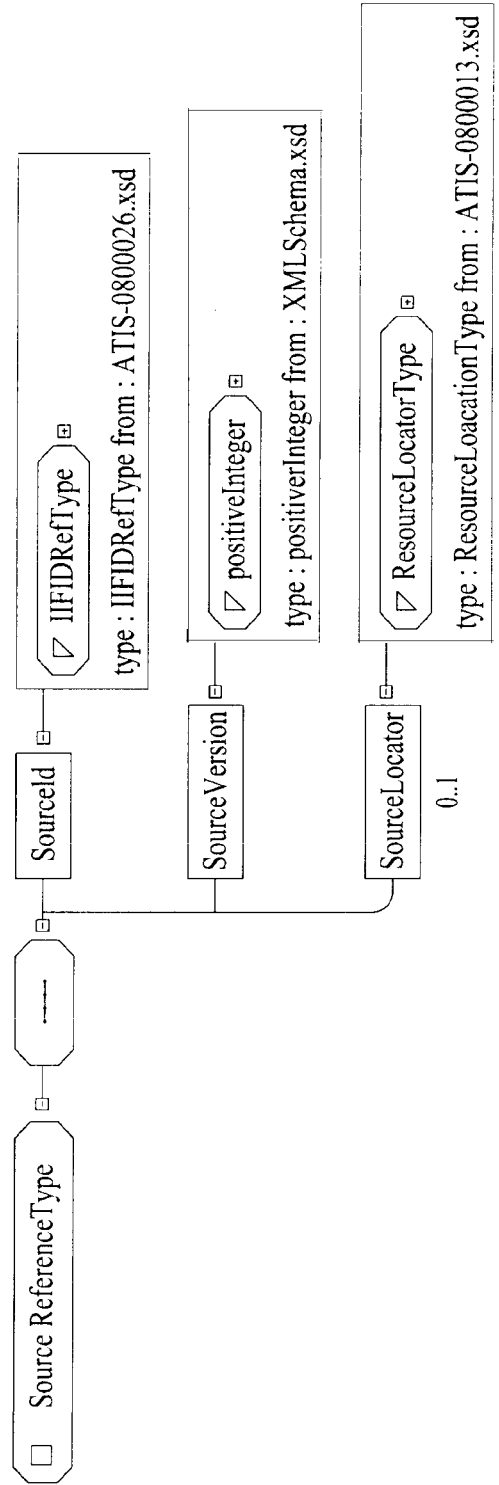
FIG. 19 is a diagram showing an XML schema of SourceReferenceType according to an embodiment of the present invention.

FIG. 19 is a diagram showing an XML schema of SourceReferenceType according to an embodiment of the present invention, which refers to a source element including media source information of a VirtualChannel Service. SourceReferenceType includes SourceId, SourceVersion and SourceLocator.

SourceId is an identifier of a referred Source element, and SourceVersion is the version of the referred Source element. SourceLocator provides a location where a Source Table including the referred Source element can be received. If DefaultSourceLocator and this element are simultaneously present, this element overrides a default value.

Figure 20:
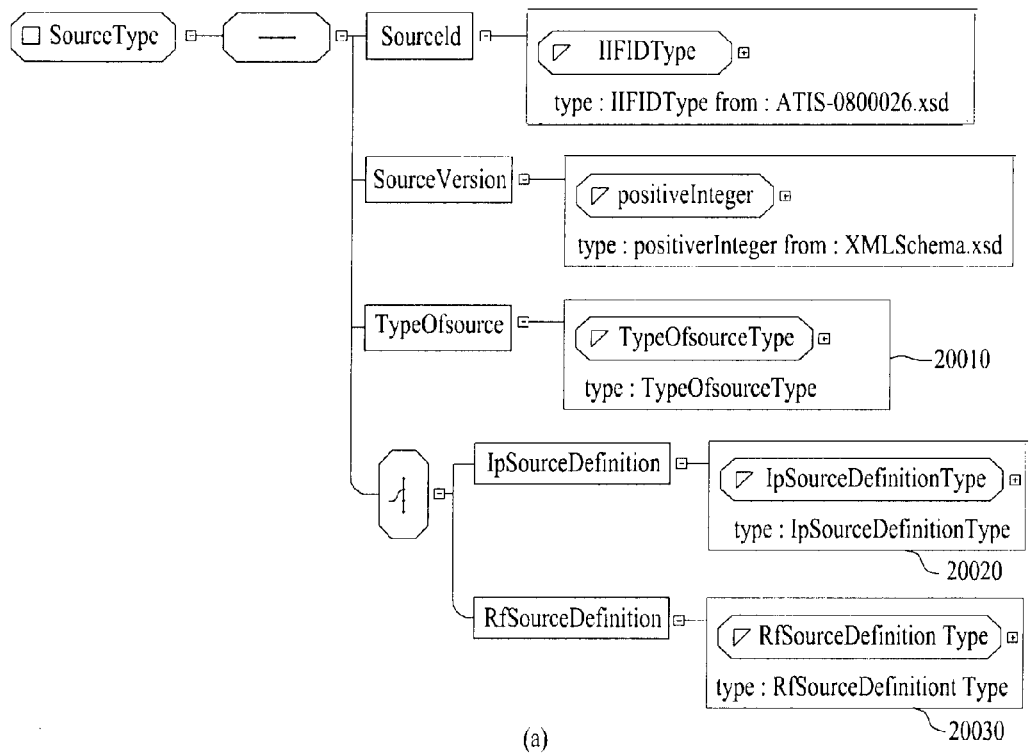
FIG. 20 is a diagram showing an XML schema of SourceType according to an embodiment of the present invention.

FIG. 20 is a diagram showing an XML schema of SourceType according to an embodiment of the present invention.

FIG. 20(a) shows an XML schema of SourceType, which includes information necessary to acquire a media source of VirtualChannelService.

SourceId is an identifier of a referred source element. This identifier shall globally and uniquely identify this source element.

SourceVersion is the version of the referred source element. The value thereof shall be increased whenever the content of a source element is changed.

TypeOfSource 20010 indicates the type of the source and has attributes such as HD, SD, PIP, Barker, etc. Barker channel is an advertisement or promotion channel, is automatically selected when a user does not have a right to view a channel, and is responsible for promoting the channel and including subscription to the channel.

IpSourceDefinition 20020 provides access information of a media source transmitted through an IP network and indicates a multicast IP address, a transport protocol and various parameters.

RfSourceDefinition 20030 provides access information of a media source transmitted through a cable TV network.

In order to signal source information of 3D content, TypeOfSource is extended to identify the source of 3D Content. This is shown in FIG. 20(b).

The added values 3DHD and 3DSD of the TypeOfSource means 3D content sources of HD and SD, respectively.

In order to provide 2D display window information per source, IPSourceDefinition and RFSourceDefinition are extended.

Figure 21:
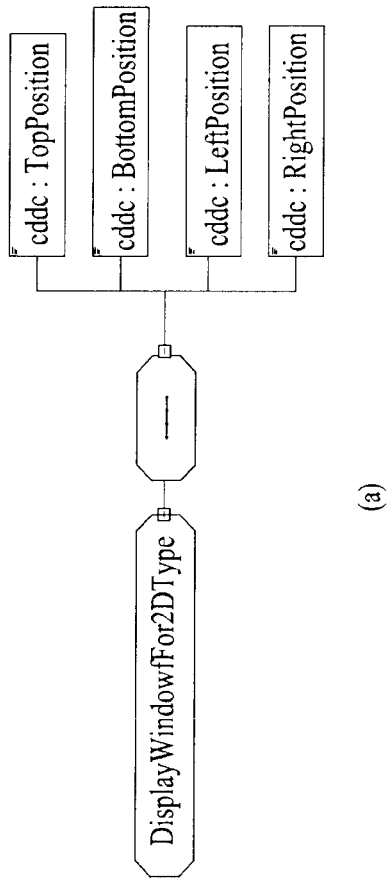
FIG. 21 is a diagram showing an XML schema including 2D display window information according to an embodiment of the present invention.

FIG. 21 is a diagram showing an XML schema including 2D display window information according to an embodiment of the present invention.

Providing information in IPSourceDefinition and RFSourceDefinition is similar to providing 2D display window information in service units in case of an ATSC or DVB broadcast. In IPTV, one service may include various media services and a plurality of sources may be specified through the above-described flexible structure. Accordingly, information about a source level may be extended to provide 2D display window region, thereby providing information in service units.

FIG. 21(a) shows an XML schema of DisplayWindowFor2DType including 2D display window region according to an embodiment of the present invention. The XML schema of DisplayWindowFor2DType may include 2D display window information for displaying a 3D video signal on a 2D screen. TopPosition, BottomPosition, LeftPosition and RightPosition of FIG. 21(a) indicate top, bottom, left and right position information of the 2D display window, respectively.

FIG. 21(b) shows an XML schema of DisplayWindowFor2DType including 2D display window region according to an embodiment of the present invention.

DisplayWindowFor2DType is a type which is newly defined in order to include 2D display window information and may include TopPosition, BottomPosition, LeftPosition and RightPosition of the screen for utilizing a 2D screen as described above.

FIG. 22 is a diagram showing an XML schema of IpSourceDefinitionType and RFSourceDefinition extended in order to include 2D display window information according to an embodiment of the present invention.

FIG. 22(a) shows a method of adding a DisplayWindowFor2D element, which is an element of DisplayWindowFor2DType, to IpSourceDefinitionType so as to provide 2D display window information 22010 per source.

IpSourceDefinitionType according to the embodiment of the present invention may include a MediaStream element, a RateMode element, a ScteSourceId element, a MpegProgramNumber element, a VideoEncoding element, an AudioEncoding element, a FecProfile element and/or a DisplayWindowFor2D element.

The MediaStream element includes IP multicast description for a media stream of this source. This MediaStream element includes an asBandwidth attribute. The unit of the asBandwidth attribute may be expressed by kilometers per second. The asBandwidth attribute is a maximum bit rate.

The RateMode element includes a programming source rate type. For example, the RateMode element may become a constant bit rate (CBR) or a variable bit rate (VBR).

The ScteSourceId element may include a source ID of an MPEG-2 TS.

The MpegProgramNumber element may include an MPEG program number.

A VideoEncoding element indicates a video encoding format of a media source.

The AudioEncoding element may indicate description of audio coding used for a programming source in the form of an audio MIME type registered in the Internet Assigned Numbers Authority (IRNA).

The FecProfile element indicates an IP FEC profile if possible.

The DisplayWindowFor2D element may include TopPosition, BottomPosition, LeftPosition and RightPosition which are 2D display window information. A reception apparatus may receive this element, convert a 3D video signal into a 2D video signal, and display the 2D video signal.

FIG. 22(b) shows a method of adding a DisplayWindowFor2D element, which is an element of DisplayWindowFor2DType, to RfSourceDefinitionType so as to provide 2D display window information per source.

RfSourceDefinitionType according to the embodiment of the present invention includes a FrequencyInKHz element, a Modulation element, a RfProfile element, a DvbTripleId element, a ScteSourceId element, an MpegProgramNumber element, a VideoEncoding element, an AudioEncoding element and/or a DisplayWindowFor2D element.

The FrequencyInKHz element indicates an RF frequency of a source in kHz. This indicates a center frequency regardless of a modulation type.

The Modulation element indicates an RF modulation type, for example, NTSC, QAM-64, QAM-256, 8-VSB, etc.

The RfProfile element may indicate a basic stream format, for example, SCTE, ATSC, DVB, etc.

The DvbTripleId element indicates a DVB triplet identifier for a broadcast stream.

The ScteSourceId element may include a source ID of an MPEG-2 TS.

The MpegProgramNumber element may indicate an MPEG-2 program number.

The VideoEncoding element may indicate description of video coding used for a programming source.

The AudioEncoding element may indicate description of audio coding used for a programming source.

The DisplayWindowFor2D element may include TopPosition, BottomPosition, LeftPosition and RightPosition information which are 2D display window information. A reception apparatus may receive this element, convert a 3D video signal into a 2D video signal, and display the 2D video signal.

In addition to the method of providing 2D display window information through a new signaling stage of the above-described IPTV, since media of the IPTV are configured as an MPEG-2 transport stream similar to that of the conventional digital broadcast and are transmitted through an IP network, a method of utilizing the header of the video stream of the present invention or providing 2D display window information through various SI tables of the SI stage is equally applicable.

If the above-described method is applied by extending the ATIS IIF standard, IPService may be extended to provide 2D display window information as follows in order to extend and use the DVB IPTV standard.

Figure 23:
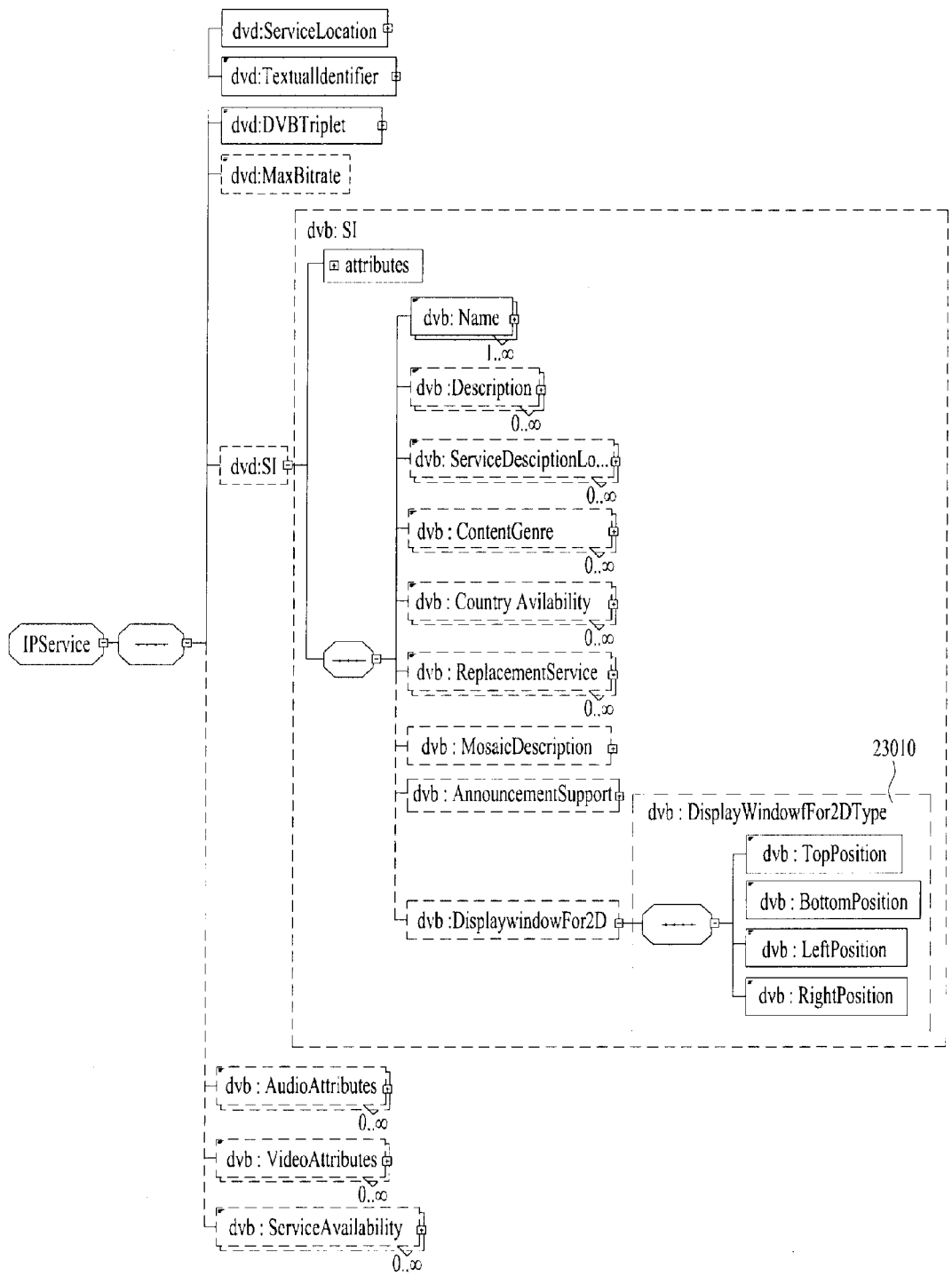
FIG. 23 is a diagram showing an XML schema of IPService extended in order to include 2D display window information according to an embodiment of the present invention.

FIG. 23 is a diagram showing an XML schema of IPService extended in order to include 2D display window information according to an embodiment of the present invention.

In DVB IPTV, each IPTV service is expressed in IPService units within DVB SD&S and an SI element provides additional detailed information of a service. This information equally provides information included in the SDT of the DVB SI. This is provided by adding a DisplayWindowFor2D element as described below. Therefore, 2D display window information 23010 which may be used per service may be provided.

IpService according to the embodiment of the present invention includes ServiceLocation information, TextualIdentifier information, DVBTriplet information, MaxBitrate information, SI information, VideoAttributes information, AudioAttributes information and/or ServiceAvailabilty information.

The ServiceLocation information indicates a location where a service can be found.

The TextualIdentifier information may indicate an ID of a text form indicating a service. If a domain name is lost, this can be obtained by context.

The DVBTriplet information may indicate a DVB triplet indicating a service. This may match a service detail in a TS.

The MaxBitrate information may indicate a maximum bit rate (in kbits/s) of operation of a TS including a service.

The SI information may include information about a service.

The SI information may include Name information, Description information, service description location information, content genre information, country availability information, replacement service information, mosaic description information, announcement support information and/or display window for 2d information.

The Name information may indicate the name of a service known to a user in the text form.

The Description information may indicate text description of a service.

The ServiceDescriptionLocation information may indicate an identifier of a BCG record for a BCG discovery element for delivering provision information.

The ContentGenre information may indicate a (main) genre of a service.

The CountryAvailability information may indicate a list of countries to which a service can or cannot be provided.

The ReplacementService information may indicate details of connection to another service if an SI record fails to provide a referred service.

The MosaicDescription information may indicate details of a service or a service package displayed as a mosaic stream.

The AnnouncementSupport information may indicate announcement supported by a service.

The DisplayWindowFor2d information may include TopPosition, BottomPosition, LeftPosition and RightPosition information which are 2D display window information. A reception apparatus may receive this element, convert a 3D video signal into a 2D video signal, and display the 2D video signal.

The VideoAttributes information may indicate a video coding method which may be used at a predetermined time during a service management period.

The AudioAttributes information may indicate an audio coding method which may be used at a predetermined time during a service management period.

The ServiceAvailabilty information may define a region to which a service can or cannot be provided.

As described above, the DVB IPTV may be also configured in the form of an MPEG-2 TS and transmitted through an IP network such that DVB SI information in a transport stream is used in the same form as the conventional DVB broadcast. Accordingly, other modes proposed by the present invention may be equally used.

As described above, if 2D display window information is transmitted in a state of being included in signaling data, a reception apparatus may display a 3D video signal two-dimensionally using the information. Next, an apparatus and method for displaying a 3D video signal using a user interface (UI) two-dimensionally by a user if such information is not included in signaling data will be described.

Signaling data of a non-signal 3D video signal broadcast service is not different from signaling of a conventional 2D video signal broadcast service. In this case, a recipient may directly recognize a 3D service through a screen and extract and view a 2D screen using a crop and zoom function. This may be implemented by upgrading software of a conventional DTV reception apparatus or adding an image signal extraction function to a newly released DTV reception apparatus. That is, a user-controlled display format change function may be added to a conventional 2DTV through software upgrade and a user-controlled display format change function may be included in a newly released 2DTV.

Upon reception of a 3DTV service, there are two cases. In a first case, service_type is equal to that of a 2D broadcast and thus a reception apparatus cannot confirm a 2D/3D service. At this time, a user must confirm a 3D service to directly display a screen extraction menu. In a second case, service_type is different from that of a 2D broadcast. In this case, a reception apparatus displays a window indicating a 3D screen such that a user selects screen switch.

A user may press a button for displaying a screen extraction UI to operate a UI for extracting a video signal. A "stereoscopic image" button is separately included in a 3DTV remote controller, but a "stereoscopic image" button is not included in a 2DTV remote controller. Therefore, a specific button may be allocated as the stereoscopic image button to be immediately connected. If a directly connected button is not present, a stereoscopic button may be added to a screen control menu item.

Figure 24:
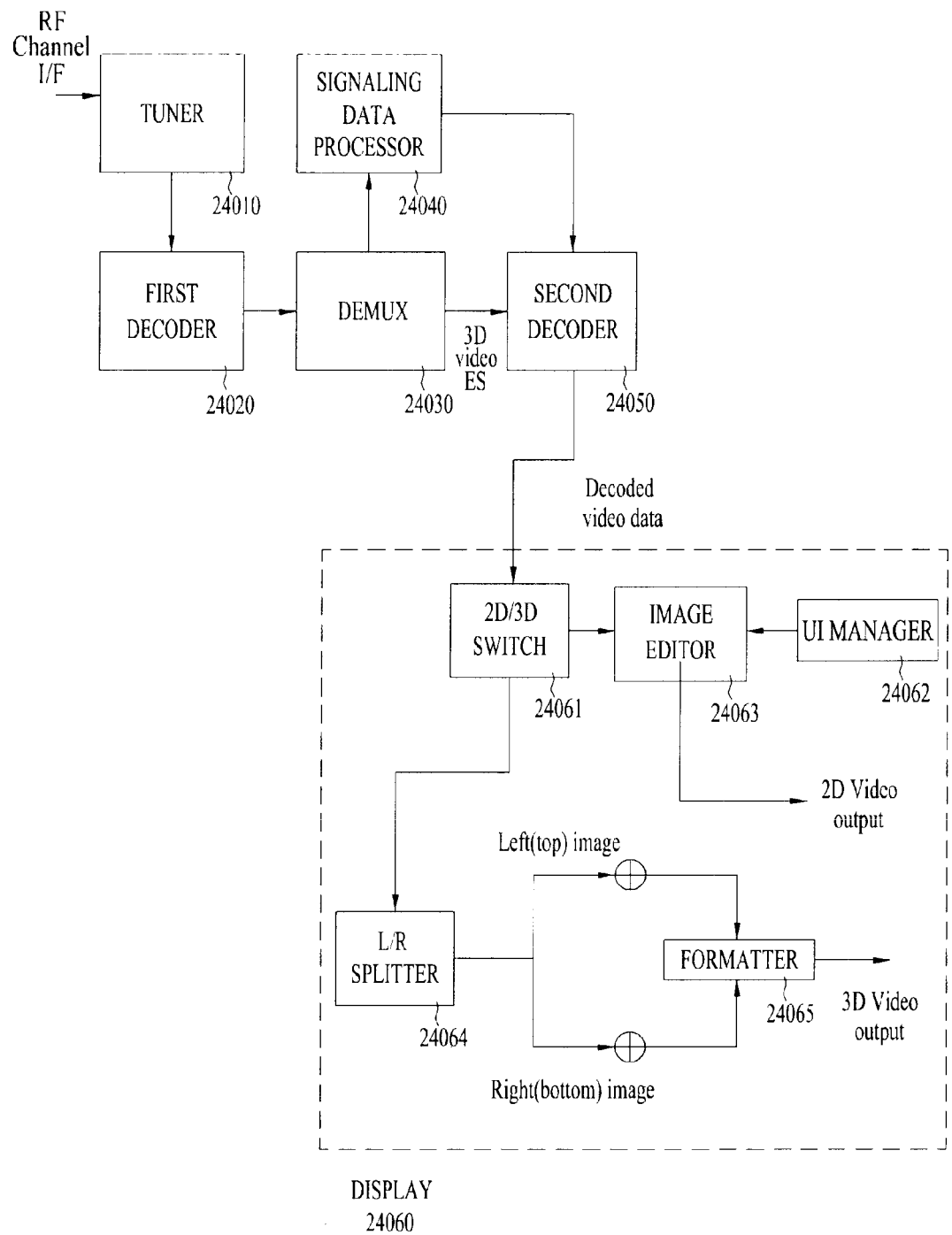
FIG. 24 is a diagram showing components of a broadcast signal reception apparatus for displaying a 3D video signal on a 2D screen according to an embodiment of the present invention.

FIG. 24 is a diagram showing components of a broadcast signal reception apparatus for displaying a 3D video signal on a 2D screen according to an embodiment of the present invention.

The broadcast signal reception apparatus according to the present invention may include a tuner 24010, a first decoder 24020, a DEMUX 24030, a signaling data processor 24040, a second decoder 24050, and/or a display 24060. The display 24060 may include a 2D/3D switch 24061, a UI manager 24062, an image editor 24063, an L/R splitter 24064 and/or a formatter 24065.

The tuner 24010 may tune to a received broadcast signal, demodulate the tuned broadcast signal, and output the demodulated broadcast signal to the first decoder 24020. In this case, the tuner 24010 may perform vestigial side band (VSB) demodulation, orthogonal frequency division multiplexing (OFDM) demodulation, etc.

The first decoder 24020 decodes the demodulated broadcast signal and output the decoded broadcast signal to the DEMUX 24030. The DEMUX 24030 may demultiplex the decoded broadcast signal, output signaling data to the signaling data processor 24040, and output a video stream to the second decoder 24050. In output of the video stream, the DEMUX 24030 may extract a video stream PID from the signaling data, extract the video stream from the decoded broadcast signal using the video stream PID, and output the video stream to the second decoder 24050.

The signaling data processor 24040 may parse the signaling data and output the parsed signaling data. In this case, the signaling data may include PSI, PSIP, DVB-SI, etc.

The second decoder 24050 may decode the video stream and output the decoded video stream.

The 2D/3D switch 24061 may check whether a 2D mode switching request signal for requesting the extracted video stream to be displayed two-dimensionally is received. The 2D/3D switch is not an essential component of the present invention and may not be included in a reception apparatus which does not support 3D video display.

If the 2D mode switching request signal is received, the UI manager 24062 may receive a 2D display window selected by a user.

The image editor 24063 may edit a frame included in the video stream extracted by the second decoder into a partial region using the selected 2D display window. At this time, the image editor may crop and scale the partial region corresponding to the 2D display window and output the scaled cropped partial region.

If the 2D mode switching request signal is not received, the L/R splitter 24064 may split a left image and a right image included in the video stream and output the left image and the right image to the formatter 24065. The formatter 24065 may receive the left image and the right image, perform 3D format conversion, and output a 3D video. The L/R splitter 24064 and the formatter 24065 are not essential components of the present invention and may not be included in a reception apparatus which does not support 3D video display.

In case of a reception apparatus which does not support 3D video display, even when the 2D mode switching request signal is not received, operation of the image editor 24063 may be performed.

FIG. 25 is a diagram showing a user interface (UI) for selecting a screen output mode of a 3D video signal according to an embodiment of the present invention.

A user may select a screen output mode. Currently, a side-by-side mode and a top-bottom mode are used for a 3D screen and other methods may be added if possible. If a 3D-to-2D button is allocated, a 3D screen output mode may be selected using a left/right movement key of a remote controller as shown in FIG. 25(*a*). Similarly, a UI of FIG. 25(*b*) may be displayed instead of the UI of FIG. 25(*a*). Since general users are unfamiliar with side-by-side or top-bottom, as shown in FIG. 25(*b*), the same screen shape as a screen display state may be selected to select a 3D video signal mode.

If the screen output mode is included as a part of a screen control menu item, as shown in FIG. 25(*c*), a desired option may be selected using an up/down movement key, similarly to screen control of a conventional DTV. In FIG. 25, since the 3D screen output mode is a side-by-side mode, the side-by-side mode is selected.

FIG. 26 is a diagram showing a UI for selecting a region to be extracted from a 3D video of a side-by-side mode and a scaling value of a video to be extracted according to an embodiment of the present invention. After a screen configuration recognized by a user is selected using an arrow key, as shown in FIG. 26(*a*), a left/right video, a top/bottom video or another video may be selected according to a 3D video signal mode (side-by-side/top-bottom/others). A video to be viewed by a user may be selected from among two or more similar videos.

When a user selects a screen, as shown in FIG. 26(*b*), a method for scaling the selected screen may be selected. Since the reception apparatus crops and scales the screen so as to correspond to the selected scaling method, the scaled screen may be displayed on the DTV screen. Although an original ratio, an aspect ratio, 16:9 or 4:3 may be described as the scaling method, the present invention is not limited thereto.

FIG. 27 is a diagram showing a confirmation message when a 3D video has been converted into a 2D video according to an embodiment of the present invention. If a user has completed conversion from a 3D video signal to a 2D video signal, the reception apparatus may display the confirmation message. The confirmation message may include a 3D video signal mode used for conversion, a region of a selected video and a scaling ratio.

FIG. 27(*a*) shows a message indicating that a region corresponding to a left image of a 3D video signal of a side-by-side mode has been scaled by an aspect ratio and converted into a 2D video signal. Similarly, FIG. 27(*b*) shows a message indicating that a region corresponding to a left image of a 3D video signal of a side-by-side mode has been scaled by a ratio of 4:3 and converted into a 2D video signal. The user may confirm the selected conversion mode through the confirmation message.

FIG. 28 is a diagram showing a UI for selecting a region to be extracted from a 3D video of a top-bottom mode and a scaling value of a video to be extracted according to an embodiment of the present invention. After a user has recognized and selected a top-bottom mode, as shown in FIG. 28(*a*), one of a top image or a bottom image may be selected.

When a user selects a screen, as shown in FIG. 28(*b*), a method for scaling the selected screen may be selected. Since the reception apparatus crops and scales the screen so as to correspond to the selected scaling method, the scaled screen may be displayed on the DTV screen. Although an original ratio, an aspect ratio, 16:9 or 4:3 may be described as the scaling method, the present invention is not limited thereto.

If conversion from a 3D video signal to a 2D video signal has been completed, the reception apparatus may display a confirmation message as shown in FIG. 28(*c*). The confirmation message may include a 3D video signal display mode, information indicating which of a top or bottom image is used for conversion, and a scaling ratio.

In order to change the left/right image or the top/bottom image while viewing the converted screen, the above-described procedure is repeated. That is, if a conversion key is separately allocated, the conversion key may be pressed to perform 3D to 2D conversion and, if a directly connected conversion key is not present, a control menu item may be displayed to perform conversion. Examples of possible combinations are shown in Table 1.

TABLE 1

| Format switch | Extracted Image |
|---|---|
| 3D to 2D | None |
| 3D to 2D | Left |
| 3D to 2D | Right |
| 3D to 2D | Top |
| 3D to 2D | Bottom |

Figure 29:
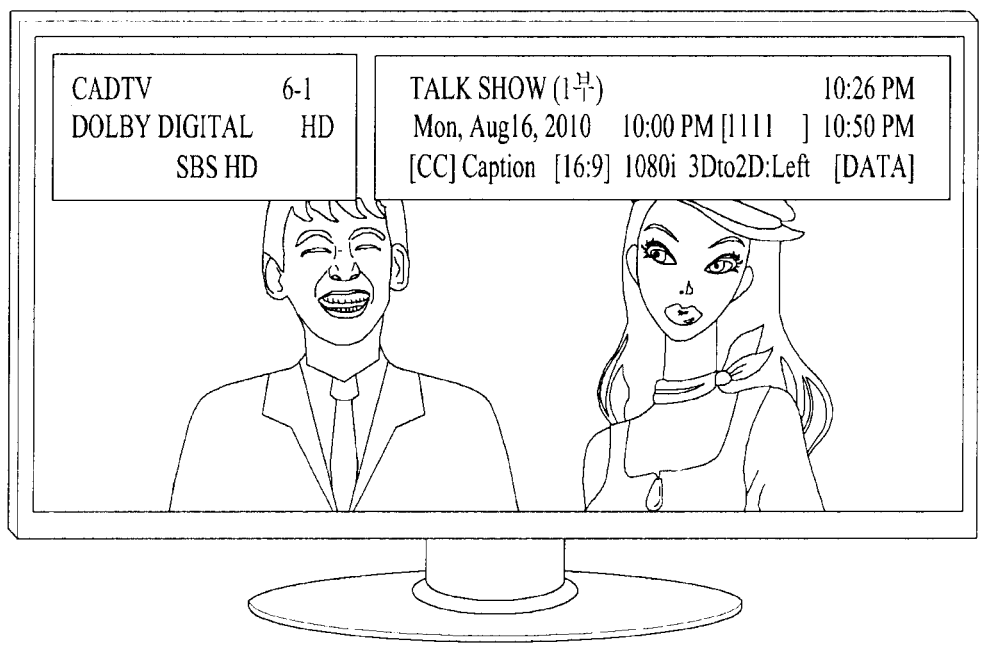
FIG. 29 is a diagram showing a message for confirming a currently converted mode according to an embodiment of the present invention.

FIG. 29 is a diagram showing a message for confirming a currently converted mode according to an embodiment of the present invention. The converted mode may be confirmed if a confirmation button is pressed while viewing a screen. The confirmation message may further include a currently converted display ratio of a broadcast, a region used for conversion, resolution, etc. in a current broadcast confirmation message of a conventional DTV. As a simple display example, information of 3Dto2D:Left may be displayed in a part for displaying a screen display ratio.

Figure 30:
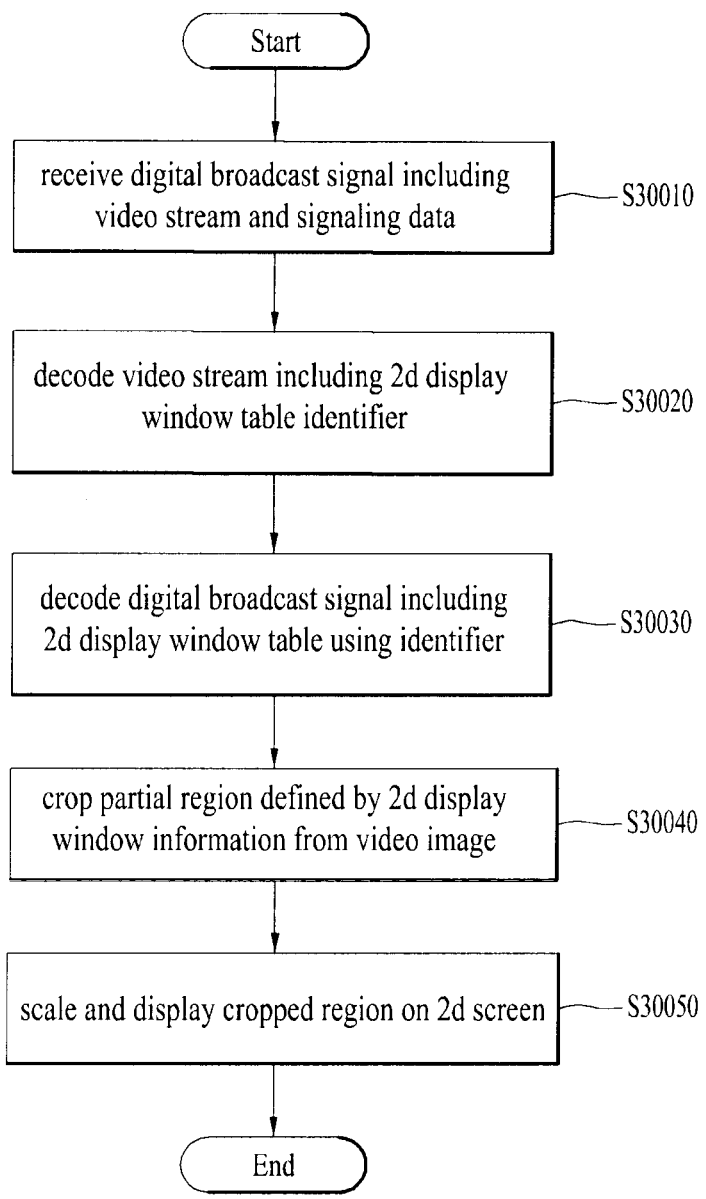
FIG. 30 is a flowchart illustrating a method of displaying a 3D video signal two-dimensionally according to an embodiment of the present invention.

FIG. 30 is a flowchart illustrating a method of displaying a 3D video signal two-dimensionally according to an embodiment of the present invention.

The tuner of the reception apparatus receives a digital broadcast signal including a video stream and signaling data (S30010). The decoder decodes the received video stream and extracts a 2D display window table identifier or index included in a header (S30020). The 2D display window table identifier or index indicates 2D display window information included in a 2D display window table. Using the identifier or index, the digital broadcast signal may be decoded and the 2D display window information may be acquired from the 2D display window table included in the signaling data (S30030).

The image editor may crop a partial region defined by the 2D display window information of the decoded video image (S30040). The cropped region is scaled and is displayed on a screen (S30050). In this case, the reception apparatus may scale the 2D display window using an interpolation or extrapolation method with respect to a vertical coordinate and a horizontal coordinate of the 2D display window.

Figure 31:
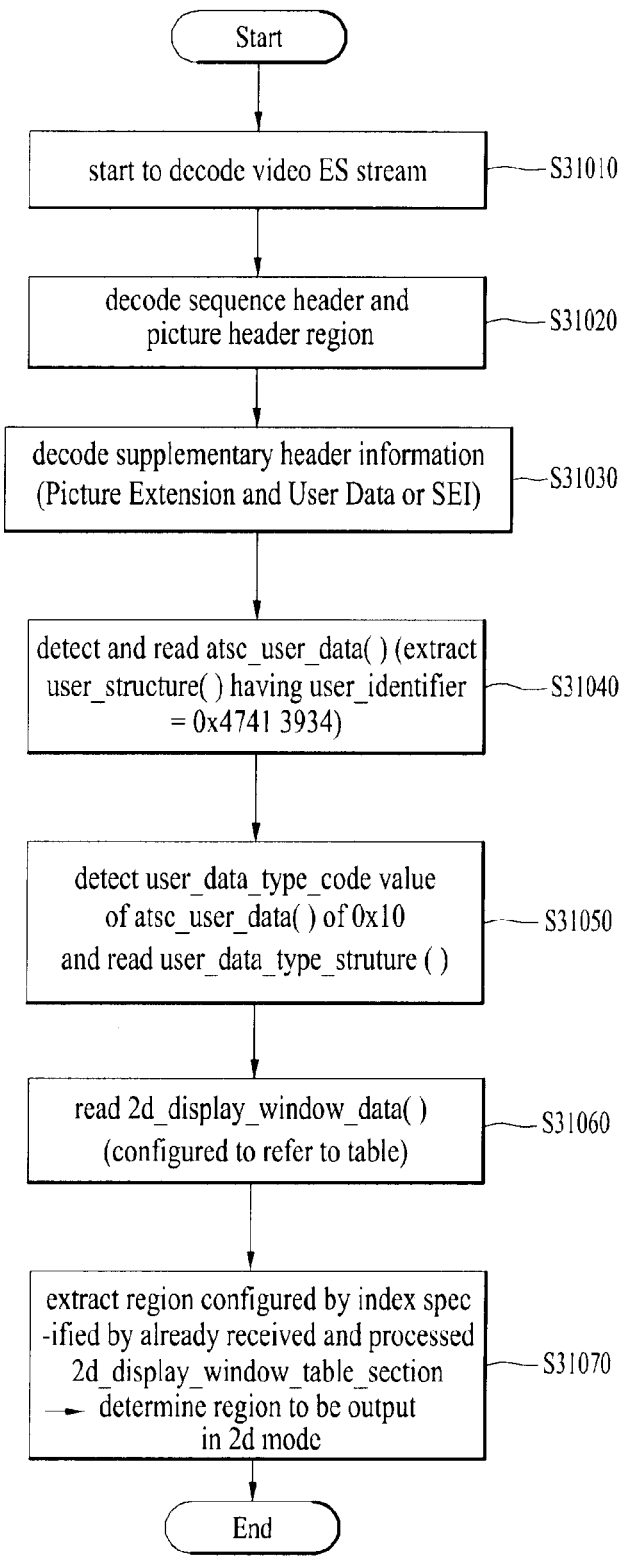
FIG. 31 is a flowchart illustrating a method of acquiring 2D display window information by a reception apparatus according to an embodiment of the present invention.

FIG. 31 is a flowchart illustrating a method of acquiring 2D display window information by a reception apparatus according to an embodiment of the present invention.

The reception apparatus may decode a received video stream (S31010). In this case, the video stream may include a plurality of video stream sections. Each video stream section may be configured in units of video streams, pictures or sequences. In addition, the video stream according to the present invention may be decoded according to a compression transmission method such as JPEG, MPEG-2, MPEG-4 or H.264/AVC.

The reception apparatus may decode a sequence header and picture header region of the decoded video stream (S31020). Thereafter, the reception apparatus may decode the supplementary header information (S31030). The supplementary header information may include a picture extension and user data region if the video stream is compressed, encoded and transmitted using an MPEG-2 method and may include an SEI region if the video stream is compressed, encoded and transmitted using an H.264/AVC method. In addition, the reception apparatus may receive and decode a picture extension and user data region after receiving the picture header and picture coding extension.

The reception apparatus may detect ATSC_user_data( ) included in the decoded supplementary header information (S31040). More specifically, in case of MPEG-2, the reception apparatus may acquire the user_data information syntax 5010 included in the decoded picture extension and user data region and acquire user_structure( ) information if a user_data_start_code information value is 0x0000 01B2 and a user_data_identifier information value is 0x4741 3934. In this case, the user-structure( ) information indicates the ATSC_user_data( ) information syntax 5020. In case of H.264/AVC, the reception apparatus may confirm an SEI payloadType value included in the decoded SEI. If the SEI payloadType value is 4, the reception apparatus may acquire user-structure( ) information when the user_identifier value included in the user_data_registered_itu_t_35( ) syntax 5011 is 0x4741 3934.

The reception apparatus may detect user_data_type_structure( ) information included in the ATSC_user_data( ) syntax 5020 (S31050). In this case, the reception apparatus may acquire user_data_type_structure( ) information of the case in which the value of user_data_type_code information included in the ATSC_user_data( ) syntax 5020 is 0x10. In this case, the user_data_type_structure( ) information may include 2d_display_window_data( ).

The reception apparatus may detect and decode 2d_display_window_data( ) and acquire the decoded 2d_display_window_data( ) syntax 5030 (S31060). The reception apparatus may decode the 2d_display_window_data( ) syntax 5030 and acquire 2d_display_window_table_id which is a 2D display window table identifier of a current video stream and 2d_display_window_index which is a 2D display window index. Accordingly, the 2D display window table may be identified using 2d_display_window_table_id and 2D display window information included in the table may be acquired using 2d_display_window_index (S31070).

Figure 32:
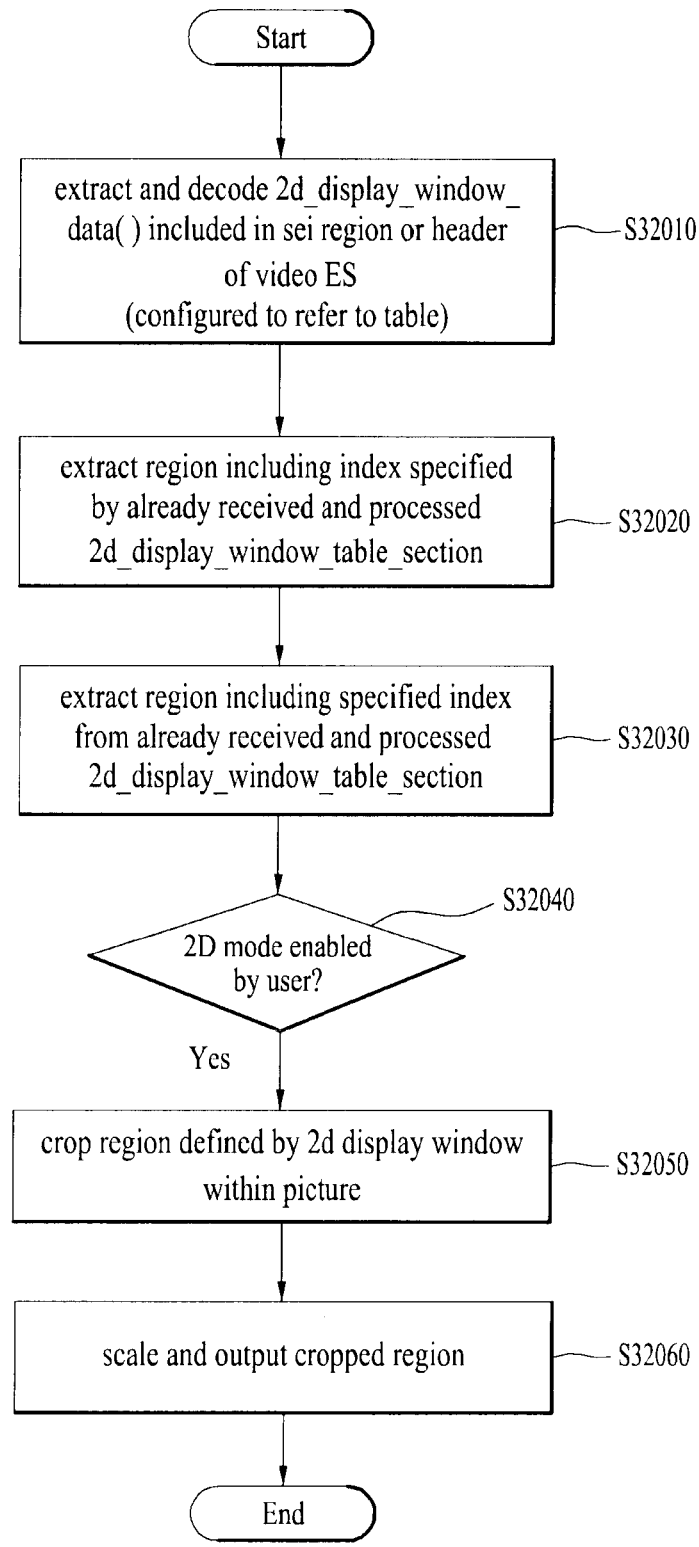
FIG. 32 is a flowchart illustrating a method of cropping and scaling a 2D display window using 2D display window information by a reception apparatus according to an embodiment of the present invention.

FIG. 32 is a flowchart illustrating a method of cropping and scaling a 2D display window using 2D display window information by a reception apparatus according to an embodiment of the present invention.

The reception apparatus may extract and decode 2d_display_window_data( ) included in the decoded supplementary header information of the video stream (S32010).

2d_display_window_data ( ) may include information about an identifier 2d_display_window_table_id and an index 2d_display_window_index of a 2D display window table including 2D display window information for displaying a partial region of a 3D video included in a video stream two-dimensionally.

The reception apparatus may extract 2D display window information from the 2D display window table using the identifier and index information and determine a 2D display window (S32020).

Thereafter, the reception apparatus may check whether a 2D mode switching request signal for requesting application of the 2D display window to the video stream is received (S32030).

If the 2D mode switching request signal is not received from the user, the procedure is completed and, if the 2D mode switching request signal is received from the user (S32040), the reception apparatus may crop a partial region of a 3D video frame using the decoded 2D display window information (S32050).

If the 2D mode switching request signal is not received from the user, the reception apparatus may perform 3D format conversion and output a 3D video without extracting the partial region of the 3D video frame.

In addition, the reception apparatus may scale and output the cropped 2D display window (S32060). In this case, the reception apparatus may scale the 2D display window using an interpolation or extrapolation method with respect to a vertical coordinate and a horizontal coordinate of the 2D display window.

Figure 33:
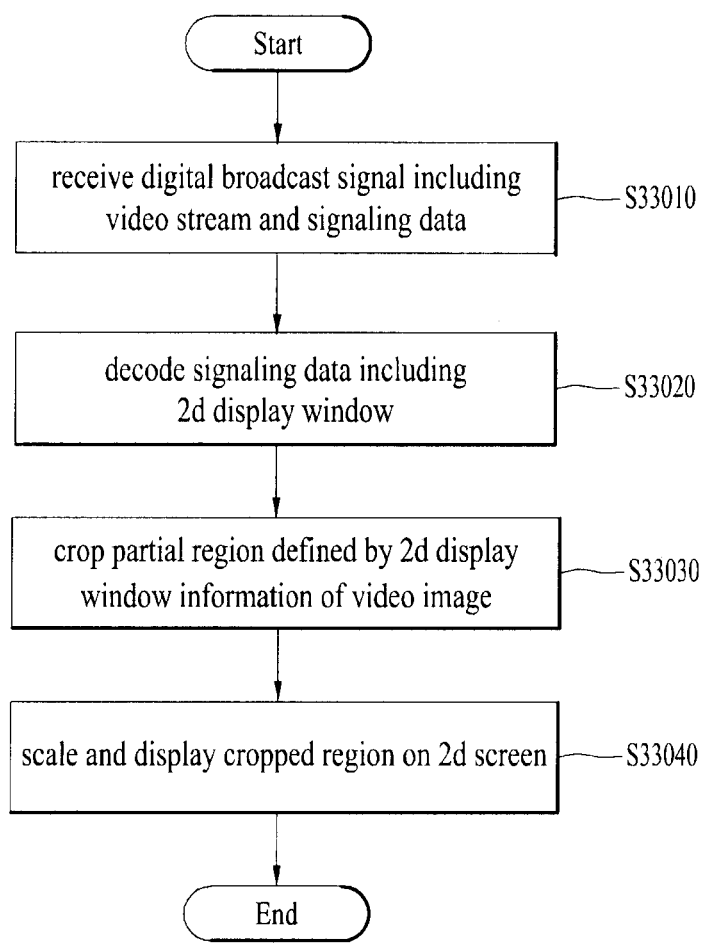
FIG. 33 is a flowchart illustrating a method of displaying a 3D video signal two-dimensionally according to an embodiment of the present invention.

FIG. 33 is a flowchart illustrating a method of displaying a 3D video signal two-dimensionally according to an embodiment of the present invention.

The tuner of the reception apparatus receives a digital broadcast signal including a video stream and signaling data (S33010).

The decoder decodes the received signaling data and decodes a 2D display window (S33020). At this time, the 2D display window information may be transmitted in a state of being included in a descriptor of a PMT, an EIT, a TVCT or an SDT. Alternatively, the descriptor of the PMT, the EIT, the TVCT and the SDT may include an identifier 2d_display_window_table_id or an index 2d_display_window_index of a 2D display window table. In this case, the 2D display window information may be transmitted in a state of being included in a 2D display window table which is a separate table.

The image editor may crop a partial region defined by the 2D display window information of the decoded video image (S33030). The cropped region is scaled and displayed on the screen (S33040).

Next, the case in which each 2D display window descriptor 2d_display_window_descriptor is transmitted in a state of being included in a TVCT, an ATSC EIT or a DVB-SI EIT will be described.

Figure 34:
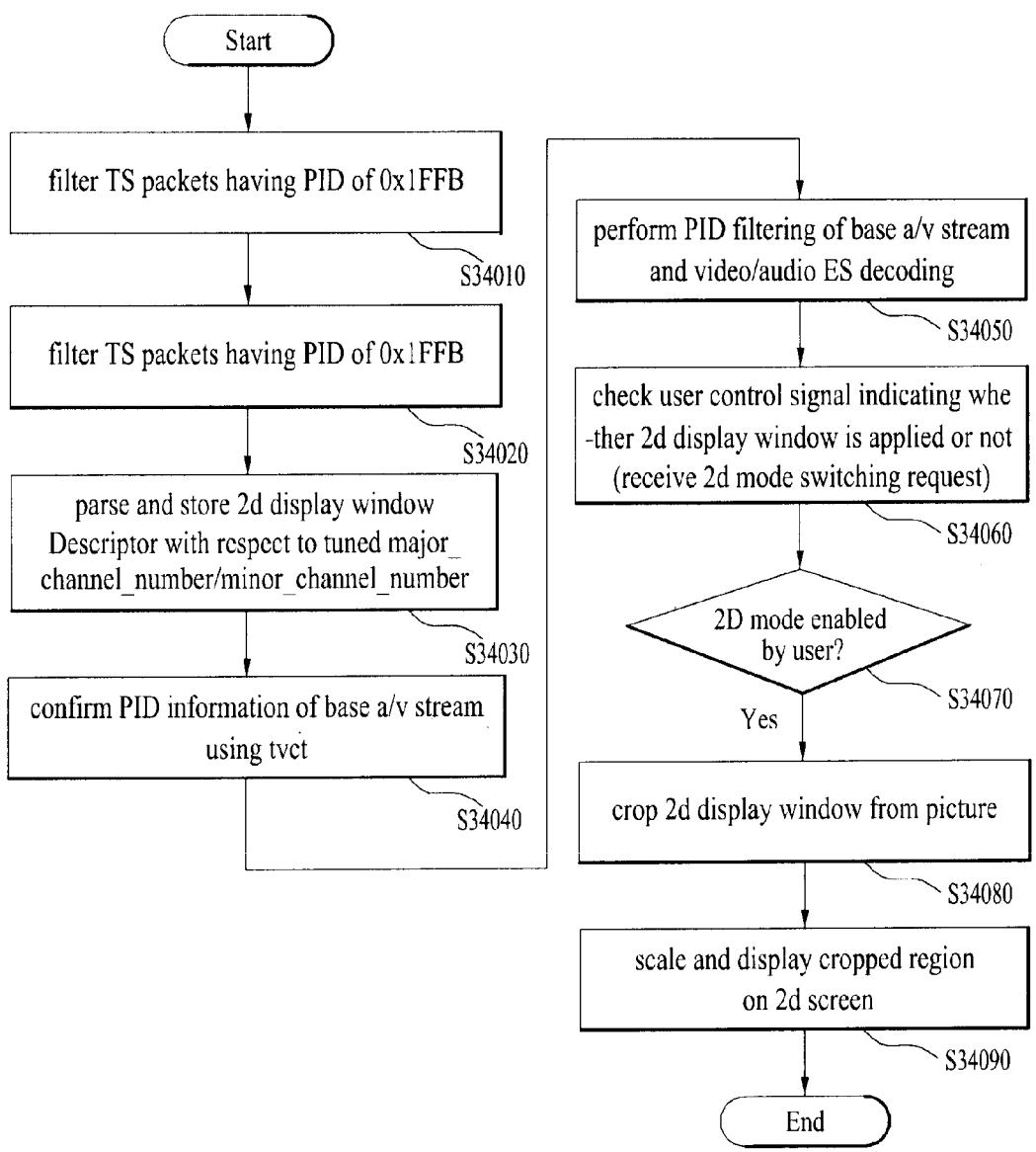
FIG. 34 is a flowchart illustrating a method of displaying a 3D video signal two-dimensionally using a TVCT according to an embodiment of the present invention.

FIG. 34 is a flowchart illustrating a method of displaying a 3D video signal two-dimensionally using a TVCT according to an embodiment of the present invention.

The reception apparatus filters transport stream (TS) packets having a base PID of 0x1FFB (S34010). Thereafter, the reception apparatus parses section data having table_id of 0xC8 so as to acquire a TVCT (S34020). The reception apparatus may parse and store 2d_display_window_descriptor with respect to the tuned major_channel_number and minor_channel_number (S34030). In this step, the reception apparatus may acquire the 2D display window information.

The reception apparatus may confirm PID information of the base A/V stream using the TVCT (S34040) and perform PID filtering of the base A/V stream and decoding of the A/V stream (S34050).

The reception apparatus checks a user control signal indicating whether the 2D display window is applied or not (S34060). If the 2D mode switching request signal is not received from the user, the procedure is completed and, if the 2D mode switching request signal is received from the user (S34070), the region defined by the 2D display window information may be cropped from the decoded video image (S34080). The cropped region is scaled and displayed on the display (S34090). In this case, the reception apparatus may scale the 2D display window using an interpolation or extrapolation method with respect to a vertical coordinate and a horizontal coordinate of the 2D display window.

In the step of parsing 2d_display_window_descriptor, if the 2D display window information of a separate table is configured to be referred to, a process of detecting the referred information may be performed using information of already received 2nd_display_window_table. This step may be performed just after parsing 2d_display_window_descriptor or just before cropping the 2D display window.

The above process may be used in a similar manner even in the embodiment in which the TVCT is used in ATSC or an SDT of DVB SI or PMI is used. When a service is selected, in order to use the service, the SDT or the PMT is parsed similar to parsing of the TVCT and 2d_display_window_descriptor is acquired from an elementary stream descriptor loop of the table and is used.

Figure 35:
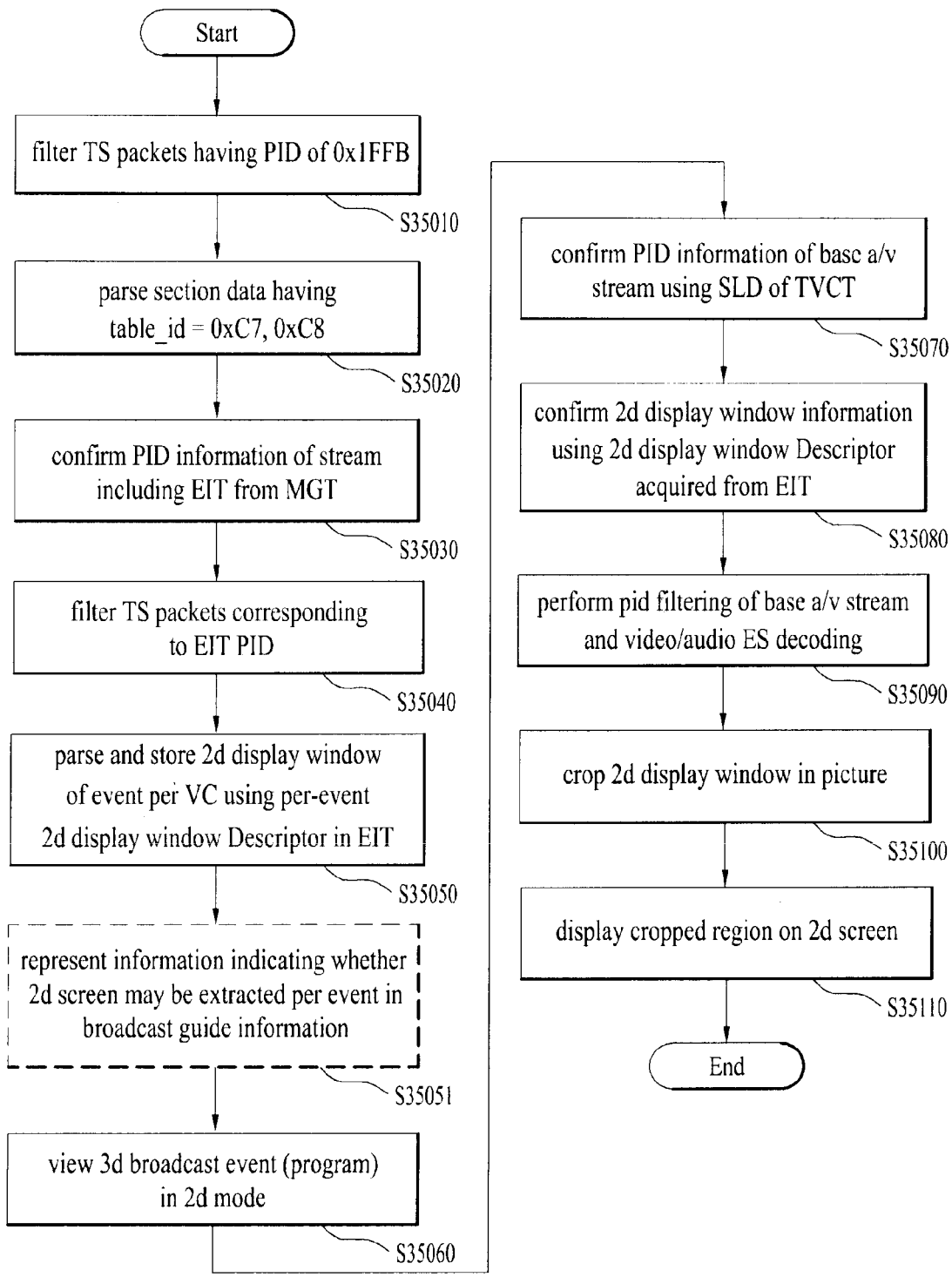
FIG. 35 is a flowchart illustrating a method of displaying a 3D video signal two-dimensionally using an ATSC PSIP EIT according to an embodiment of the present invention.

FIG. 35 is a flowchart illustrating a method of displaying a 3D video signal two-dimensionally using an ATSC PSIP EIT according to an embodiment of the present invention.

The reception apparatus filters a transport stream (TS) packet having a base PID of 0x1FFB (S35010). Thereafter, the reception apparatus parses section data having table_id of 0xC7 and 0xC8 so as to acquire an MGT and a TVCT (S35020). The reception apparatus may confirm PID information of a stream including an EIT from the MGE (S30530) and filters TS packets corresponding to the confirmed EIT PID (S35040). Using per-event 2d_display_window_descriptor included in the EIT, 2D display window information of an event per VC may be parsed and stored (S35050).

The reception apparatus may represent information indicating whether a 2D screen may be extracted per event in broadcast guide information (S35051). This step is not an essential component of the present invention and may be excluded according to embodiments.

If the 2D mode switching request signal is received (S35060), the reception apparatus may confirm PID information of the base A/V stream using a service location descriptor (SLD) included in the TVCT (S35070). The SLD defines a stream type, a PID and a language code of each base stream.

The reception apparatus may confirm 2D display window information using 2d_display_window_descriptor acquired in S35050 (S35080). In this step, a region to be displayed two-dimensionally in the 3D video signal is determined.

The reception apparatus may perform PID filtering of the base A/V stream and decoding of the A/V stream (S35090) and crop a region defined by the 2D display window information from the decoded video image (S35100). The cropped region is scaled and output on a display (S35110). In this case, the reception apparatus may scale the 2D display window using an interpolation or extrapolation method with respect to a vertical coordinate and a horizontal coordinate of the 2D display window.

In the step of parsing 2d_display_window_descriptor, if the 2D display window information of a separate table is configured to be referred to, a process of detecting the referred information may be performed using information of already received 2nd_display_window_table. This step may be performed just after parsing 2d_display_window_descriptor or just before cropping the 2D display window.

Figure 36:
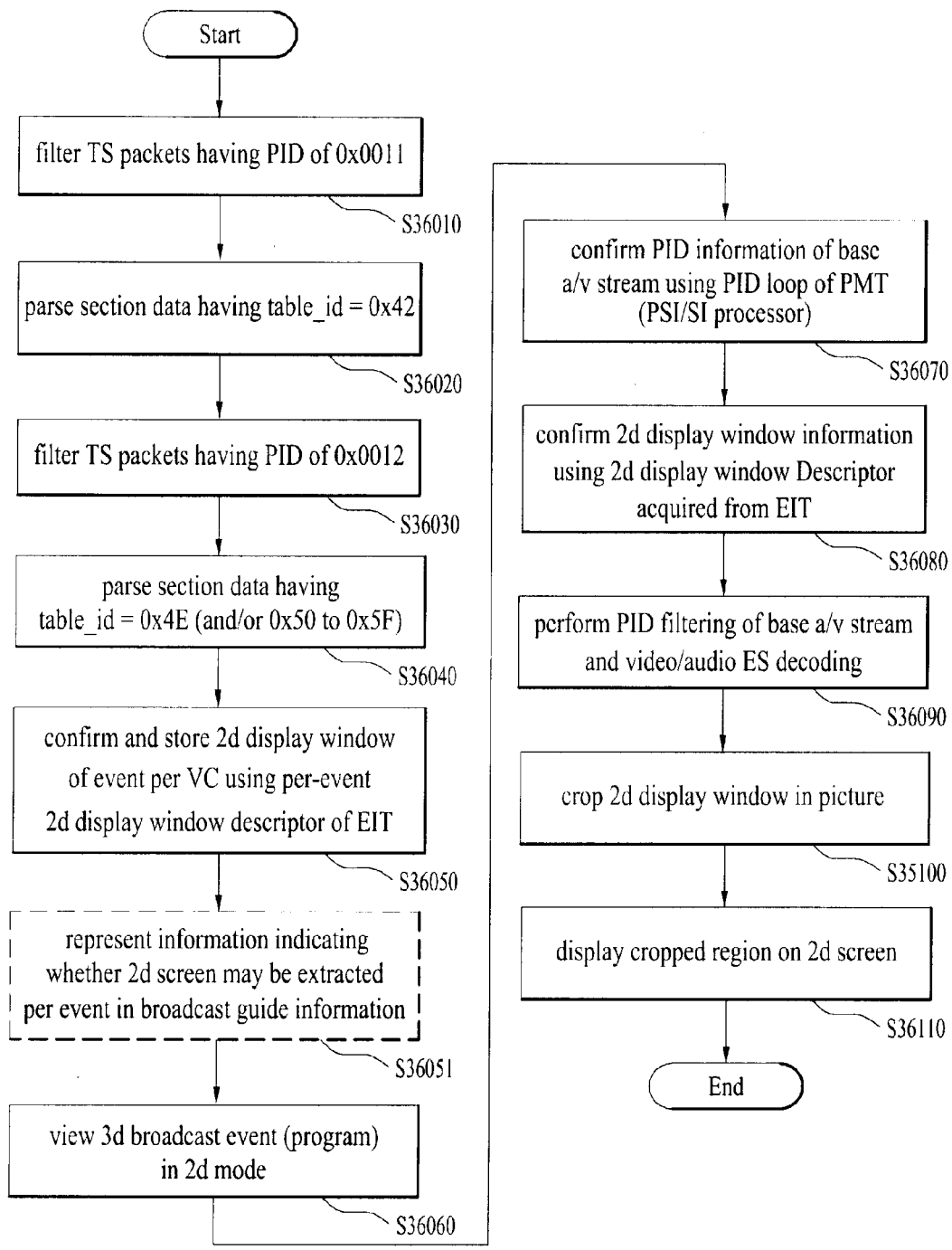
FIG. 36 is a flowchart illustrating a method of displaying a 3D video signal two-dimensionally using a DVB-SI EIT according to an embodiment of the present invention.

FIG. 36 is a flowchart illustrating a method of displaying a 3D video signal two-dimensionally using a DVB-SI EIT according to an embodiment of the present invention.

The reception apparatus filters transport stream (TS) packets having a base PID of an SDT of 0x0011 (S36010). Thereafter, the reception apparatus parses section data having table_id of 0x42 so as to acquire an SDT (S36020). The reception apparatus parses section data having table_id of 0x4E to acquire EIT present/following. Additionally or alternatively, the reception apparatus parses section data having table_id of 0x50~x=0x5F so as to acquire an EIT schedule (S36040). The reception apparatus may confirm and store 2D display window information of an event per VC using per-event 2d_display_window_descriptor included in the EIT (S36050).

The reception apparatus may represent information indicating whether a 2D screen may be extracted per event in broadcast guide information (S36051). This step is not an essential component of the present invention and may be excluded according to embodiments.

If the 2D mode switching request signal is received (S36060), the reception apparatus may confirm PID information of the base A/V stream using a PID loop included in a program map table (PMT) (S36070).

The reception apparatus may confirm 2D display window information using 2d_display_window_descriptor acquired in S36050 (S35080). In this step, a region to be displayed two-dimensionally in the 3D video signal is determined.

The reception apparatus may performs PID filtering of the base A/V stream and decoding of the A/V stream (S36090) and crop a region defined by the 2D display window information from the decoded video (S36100). The cropped region is scaled and output on a display (S36110). In this case, the reception apparatus may scale the 2D display window using an interpolation or extrapolation method with respect to a vertical coordinate and a horizontal coordinate of the 2D display window.

In the step of parsing 2d_display_window_descriptor, if the 2D display window information of a separate table is configured to be referred to, a process of detecting the referred information may be performed using information of already received 2nd_display_window_table. This step may be performed just after parsing 2d_display_window_descriptor or just before cropping the 2D display window.

Figure 37:
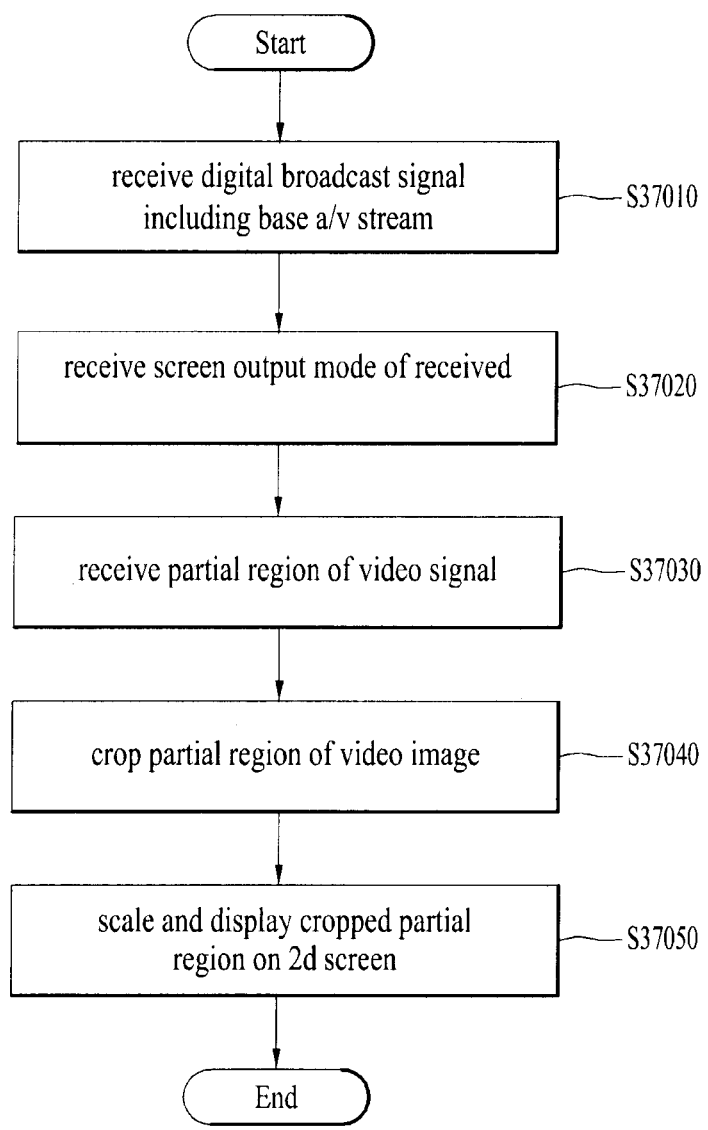
FIG. 37 is a flowchart illustrating a method of displaying a 3D video signal two-dimensionally using a UI according to an embodiment of the present invention.

FIG. 37 is a flowchart illustrating a method of displaying a 3D video signal two-dimensionally using a UI according to an embodiment of the present invention. In this embodiment, since a received digital broadcast signal includes a 3D video signal but signaling data included therein is not different from signaling data of a conventional 2D video signal broadcast service, the user must directly specify a 2D display window.

The reception apparatus receives a digital broadcast signal including a base A/V stream (S37010). In case of a 3D video signal, two similar screens are simultaneously displayed. The user may input a screen output mode of the 3D video signal received through the UI (S37020). At this time, the screen output mode includes a side-by-side mode, a top-bottom mode or another mode. If the output mode is decided, a partial region of the 3D video image may be received (S37030). For example, in case of the side-by-side mode, one of the left/right image may be selected and, in case of the top-bottom mode, one of the top/bottom image may be selected.

If the partial region is selected, the reception apparatus may crop a selected region of the video image (S37040), scale the cropped region (S37050) and display the scaled region on a 2D screen.

The converted format is maintained until the event (the program) has ended and only while power is supplied. If the program has ended, an alert window is displayed to ask if the viewer wishes to continue using the same format.

Figure 38:
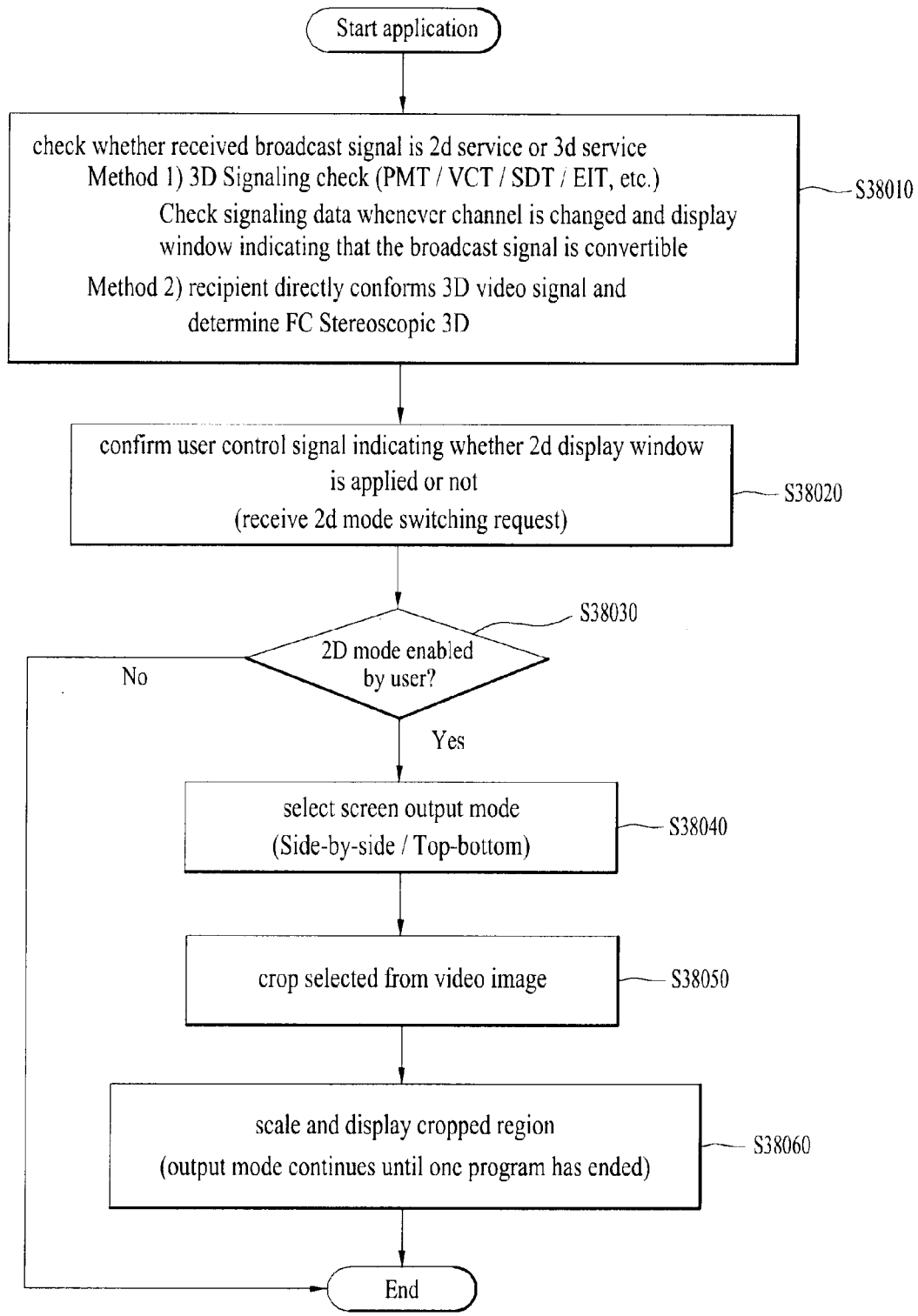
FIG. 38 is a flowchart illustrating a method of displaying a 3D video signal two-dimensionally using a UI according to an embodiment of the present invention.

FIG. 38 is a flowchart illustrating a method of displaying a 3D video signal two-dimensionally using a UI according to an embodiment of the present invention.

The reception apparatus confirms whether a currently received broadcast signal is a 2d service or a 3d service (S38010). In this step, if signaling data indicating a 3D video signal is included, whenever the channel is changed, the signaling data may be checked to display an alert window indicating that the broadcast signal is convertible. In contrast, if signaling data indicating a 3D video signal is not included, a user may directly confirm a 3D video signal. As described above, if a plurality of similar video signals is simultaneously output, the user may confirm that the received broadcast signal is a 3D video signal.

The reception apparatus may check whether a 2d mode switching request signal which is a user control signal indicating whether a 2D display window is applied is received (S38020).

If the 2D mode switching request signal is not received from the user, the procedure is completed and, if the 2D mode switching request signal is received from the user (S38030), a UE for selecting a screen output mode may be displayed to select the screen output mode (S38040). In this step, the screen output mode may include a side-by-side mode, a top-bottom mode or another mode.

The reception apparatus may crop a selected region in order to display the video signal on a 2D screen (S38050). At this time, the selected region is one of the left or right image in case of the side-by-side mode and is one of the top or bottom image in case of the top-bottom mode. The cropped region is scaled and displayed on a display (S38060). In this case, the reception apparatus may scale the 2D display window using an interpolation or extrapolation method with respect to a vertical coordinate and a horizontal coordinate of the 2D display window.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

MODE FOR INVENTION

Various embodiments have been described in the best mode for carrying out the invention.

INDUSTRIAL APPLICABILITY

As described above, the present invention is wholly or partially applicable to a digital broadcast system.

The invention claimed is:

1. A method for transmitting a broadcast signal by a transmitter, the method comprising:
encoding service data for a service,
transmitting the broadcast signal including the encoded service data,
wherein the service data includes a frame comprising two constituent frames forming a left view and a right view of a stereo view scene,
wherein a type of packing arrangement of the frame is one of a side-by-side packing arrangement and a top-bottom packing arrangement,
wherein the service data comprises display window information,
wherein the display window information indicates that a display window is an area within only one of the two constituent frames,
wherein the display window information comprises values for defining the display window,
wherein the display window information specifies samples of the frame that are within the display window, in terms of a rectangular region specified in the frame coordinates for display,
wherein the display window information is used to obtain a portion of a region from the frame.

2. The method according to claim 1, the method further comprising:
encoding signaling data for the service,
wherein the signaling data comprises category information indicating a category of the service,
wherein the broadcast signal further includes the signaling data.

3. An apparatus for transmitting a broadcast signal, the apparatus comprising:
an encoder for encoding service data for a service,
a transmitter for transmitting the broadcast signal including the encoded service data,
wherein the service data includes a frame comprising two constituent frames forming a left view and a right view of a stereo view scene,
wherein a type of packing arrangement of the frame is one of a side-by-side packing arrangement and a top-bottom packing arrangement,
wherein the service data comprises display window information,
wherein the display window information indicates that a display window is an area within only one of the two constituent frames,
wherein the display window information comprises values for defining the display window,
wherein the display window information specifies samples of the frame that are within the display window, in terms of a rectangular region specified in the frame coordinates for display,
wherein the display window information is used to obtain a portion of a region from the frame.

4. The apparatus according to claim 3,
the encoder further encodes signaling data for the service,
wherein the signaling data comprises information indicating a category of the service,
wherein the broadcast signal further includes the signaling data.

5. A method for receiving a broadcast signal by a receiver, the method comprising:
receiving the broadcast signal including service data,
wherein the service data includes a frame comprising two constituent frames forming a left view and a right view of a stereo view scene,
wherein a type of packing arrangement of the frame is one of a side-by-side packing arrangement and a top-bottom packing arrangement,
wherein the service data comprises display window information,
wherein the display window information indicates that a display window is an area within only one of the two constituent frames,
wherein the display window information comprises values for defining the display window,
wherein the display window information specifies samples of the frame that are within the display window, in terms of a rectangular region specified in the frame coordinates for display;
decoding the display window information being used to obtain a portion of a region from the frame; and
outputting the portion of the region.

6. The method according to claim 5, the method further comprising:
decoding signaling data for the service,
wherein the signaling data comprises category information indicating a category of the service,
wherein the broadcast signal further includes the signaling data.

7. The method according to claim 5, the method further comprising:
receiving mode information for requesting the portion of the region from the frame;
obtaining the portion of the region from the frame using the display window information; and
resizing the obtained portion of the region and display the resized portion of the region.

8. The method according to claim 7, the method further comprising:
generating and displaying an user interface requesting the mode information.

9. An apparatus for receiving a broadcast signal, the apparatus comprising:
a tuner for receiving the broadcast signal including service data,
wherein the service data includes a frame comprising two constituent frames forming a left view and a right view of a stereo view scene,
wherein a type of packing arrangement of the frame is one of a side-by-side packing arrangement and a top-bottom packing arrangement,
wherein the service data comprises display window information,
wherein the display window information indicates that a display window is an area within only one of the two constituent frames,
wherein the display window information comprises values for defining the display window,
wherein the display window information specifies samples of the frame that are within the display window, in terms of a rectangular region specified in the frame coordinates for display; and a decoder configured to decode the display window information being used to obtain a portion of region from the frame, a display configured to output the portion of the region.

10. The apparatus according to claim 9, the decoder further decodes signaling data for the service, wherein the signaling data comprises information indicating a category of the service, wherein the broadcast signal further includes the signaling data.

11. The apparatus according to claim 9 further comprising:

a conversion switch configured to receive mode information for requesting the portion of the region from the frame;

an image editor configured to obtain the portion of the region using the display window information, wherein the image editor further configured to resize the obtained portion of the region; and a display configured to display the resized portion of the region.

12. The apparatus according to claim 11 further comprising:

an user interface manager configured to generate and display an user interface requesting the mode information.

* * * * *